(12) United States Patent
Gale

(10) Patent No.: US 9,381,785 B2
(45) Date of Patent: Jul. 5, 2016

(54) TILTING VEHICLE AND A METHOD OF TILTING A VEHICLE WITH REAR WHEEL SUPPORTS HAVING HYDRAULIC CYLINDERS COMMUNICATING THROUGH A PUMP

(76) Inventor: David Andrew Gale, London (GB)

( * ) Notice: Subject to any disclaimer, the term of this patent is extended or adjusted under 35 U.S.C. 154(b) by 25 days.

(21) Appl. No.: 13/520,889

(22) PCT Filed: Jan. 7, 2011

(86) PCT No.: PCT/GB2011/050018
§ 371 (c)(1),
(2), (4) Date: Dec. 6, 2012

(87) PCT Pub. No.: WO2011/083335
PCT Pub. Date: Jul. 14, 2011

(65) Prior Publication Data
US 2013/0068550 A1 Mar. 21, 2013

(30) Foreign Application Priority Data
Jan. 8, 2010 (GB) .................................. 1000244.2

(51) Int. Cl.
*B60K 5/10* (2006.01)
*B60G 21/073* (2006.01)
(Continued)

(52) U.S. Cl.
CPC ................ *B60G 21/073* (2013.01); *B60G 3/14* (2013.01); *B60G 3/145* (2013.01); *B60G 7/006* (2013.01);
(Continued)

(58) Field of Classification Search
CPC ............ B60K 5/10; B62D 9/02; B62D 61/08; B60G 17/0162; B60G 21/007; B60G 21/073; B60G 2800/24

USPC ......... 280/5.509, 124.103; 180/210, 215, 216
See application file for complete search history.

(56) References Cited

U.S. PATENT DOCUMENTS 2,184,202 A 12/1939 Tschanz
2,743,941 A * 5/1956 Walker ...................... 280/5.509
(Continued)

FOREIGN PATENT DOCUMENTS

AU 1467183 A 12/1983
CN 201023543 Y 2/2008
(Continued)

OTHER PUBLICATIONS

PCT/GB2011/050018 International Search Report and Written Opinion dated Aug. 9, 2011 (19 p.).
(Continued)

*Primary Examiner* — Ruth Ilan
(74) *Attorney, Agent, or Firm* — Conley Rose, P.C.

(57) ABSTRACT

There is disclosed herein a vehicle configuration comprising a chassis, at least one front wheel, two rear wheels, and a propulsion unit driving the rear wheels. The rear wheels are connected to the chassis by a wheel support assembly configured for allowing movement of each rear wheel relative to the chassis, a hydraulic cylinder connected to the chassis and the rear wheel supports, and a piston connected the rear wheel supports and the chassis. The piston dividing the hydraulic cylinder into fluidly connected first and second chambers such that movement of hydraulic fluid from the first or second chamber of a hydraulic cylinder to the respective first or second chamber of another hydraulic cylinder displaces the pistons of the hydraulic cylinders in opposing directions relative to the respective housings and causes the chassis to articulate with respect to the surface.

38 Claims, 19 Drawing Sheets

(51) Int. Cl.
*B60G 3/14* (2006.01)
*B60G 7/00* (2006.01)
*B60G 17/005* (2006.01)
*B60G 17/015* (2006.01)
*B60G 17/016* (2006.01)
*B60G 21/00* (2006.01)
*B62D 9/02* (2006.01)
*B62K 5/027* (2013.01)
*B62K 5/10* (2013.01)
*F16F 9/22* (2006.01)
*B62D 5/12* (2006.01)
*B62K 25/18* (2006.01)

(52) U.S. Cl.
CPC .............. *B60G 7/008* (2013.01); *B60G 17/005* (2013.01); *B60G 17/015* (2013.01); *B60G 17/0152* (2013.01); *B60G 17/0162* (2013.01); *B60G 21/007* (2013.01); *B62D 5/12* (2013.01); *B62D 9/02* (2013.01); *B62K 5/027* (2013.01); *B62K 5/10* (2013.01); *B62K 25/18* (2013.01); *F16F 9/22* (2013.01); *B60G 2200/132* (2013.01); *B60G 2200/1324* (2013.01); *B60G 2200/144* (2013.01); *B60G 2200/445* (2013.01); *B60G 2200/46* (2013.01); *B60G 2200/462* (2013.01); *B60G 2202/32* (2013.01); *B60G 2202/322* (2013.01); *B60G 2202/413* (2013.01); *B60G 2202/414* (2013.01); *B60G 2202/416* (2013.01); *B60G 2204/12* (2013.01); *B60G 2204/13* (2013.01); *B60G 2204/14* (2013.01); *B60G 2204/4605* (2013.01); *B60G 2204/62* (2013.01); *B60G 2204/82* (2013.01); *B60G 2204/8304* (2013.01); *B60G 2206/10* (2013.01); *B60G 2300/122* (2013.01); *B60G 2300/13* (2013.01); *B60G 2300/37* (2013.01); *B60G 2300/45* (2013.01); *B60G 2400/052* (2013.10); *B60G 2400/10* (2013.01); *B60G 2400/204* (2013.01); *B60G 2400/30* (2013.01); *B60G 2500/02* (2013.01); *B60G 2500/40* (2013.01); *B60G 2800/012* (2013.01); *B60G 2800/24* (2013.01)

(56) References Cited

U.S. PATENT DOCUMENTS

| | | | |
|---|---|---|---|
| 4,351,410 | A | 9/1982 | Townsend |
| RE32,736 | E | 8/1988 | Lovell |
| 5,927,424 | A * | 7/1999 | Van Den Brink et al. .... 180/216 |
| 6,435,522 | B1 * | 8/2002 | Van Den Brink et al. . 280/5.509 |
| 8,249,775 | B2 * | 8/2012 | Van Den Brink ............... 701/38 |
| 8,613,340 | B2 * | 12/2013 | Hsu et al. ...................... 180/215 |
| 2005/0212247 | A1 | 9/2005 | Rautenbach |
| 2007/0126199 | A1 | 6/2007 | Peng et al. |
| 2007/0193803 | A1 | 8/2007 | Geiser |
| 2007/0262549 | A1 | 11/2007 | Haerr et al. |
| 2008/0012262 | A1 | 1/2008 | Carabelli et al. |
| 2008/0238005 | A1 | 10/2008 | James |
| 2009/0057048 | A1 * | 3/2009 | Chien et al. ................... 180/282 |
| 2009/0121448 | A1 * | 5/2009 | Marabese ............. 280/124.112 |
| 2010/0007109 | A1 | 1/2010 | Mighell |
| 2010/0032915 | A1 | 2/2010 | Hsu et al. |
| 2010/0324808 | A1 | 12/2010 | Moulene et al. |
| 2011/0095494 | A1 * | 4/2011 | White ........................ 280/5.509 |
| 2014/0312580 | A1 | 10/2014 | Gale |

FOREIGN PATENT DOCUMENTS

| | | | |
|---|---|---|---|
| DE | 1947232 | A1 | 4/1971 |
| DE | 4035128 | A1 | 6/1992 |
| DE | 9414724 | U1 | 11/1994 |
| DE | 20217112 | U1 | 3/2003 |
| DE | 10227417 | A1 | 2/2004 |
| DE | 102009056105 | A1 | 6/2010 |
| EP | 1437324 | A1 | 7/2004 |
| EP | 1561612 | | 8/2005 |
| EP | 2000336 | A1 | 12/2008 |
| FR | 2646379 | A1 | 11/1990 |
| FR | 2654990 | | 5/1991 |
| GB | 1561253 | A | 2/1980 |
| GB | 2444250 | A | 6/2008 |
| GB | 2 450 740 | A * | 1/2009 |
| GB | 2476807 | A | 7/2011 |
| GB | 2492757 | A | 1/2013 |
| JP | S4938318 | A | 4/1974 |
| JP | S56500769 | A | 6/1981 |
| JP | S5741278 | A | 3/1982 |
| JP | H11197191 | A | 7/1999 |
| WO | 81/00088 | A1 | 1/1981 |
| WO | 9727071 | A1 | 7/1997 |
| WO | 99/41096 | A1 | 8/1999 |
| WO | 99/47372 | A1 | 9/1999 |
| WO | 99/61302 | A1 | 12/1999 |
| WO | 00/18597 | A1 | 4/2000 |
| WO | 01/36253 | A1 | 5/2001 |
| WO | 2004/056645 | A1 | 7/2004 |
| WO | 2005/075278 | A1 | 8/2005 |
| WO | 2008/011917 | A1 | 1/2008 |
| WO | 2008/065436 | A1 | 6/2008 |
| WO | 2008/150173 | A2 | 12/2008 |
| WO | WO 2009/087595 | A1 * | 7/2009 |
| WO | 2009/106978 | A1 | 9/2009 |
| WO | 2011/005945 | A1 | 1/2011 |
| WO | 2011/083335 | A2 | 7/2011 |
| WO | 2013/005007 | A1 | 1/2013 |

OTHER PUBLICATIONS

Japanese Office Action dated Oct. 29, 2014, for Japanese Application No. 2012-547548 (4 p.).
EPO Communication Regarding Third Party Observations dated May 17, 2013, for European Application No. 11700575.1 (1 p.).
Bienvenue sur www.troisroues.com (2 p.).
Search Report dated Apr. 13, 2011 for British Application No. 1100226.8 (1 p.).
Search Report dated Nov. 8, 2011 for British Application No. 1111638.1 (21 p.).
Dixon, J.C., "Suspension Geometry and Computation," 2009 John Wiley & Sons, Ltd. (40 p.).
PCT/GB2012/051519 Written Opinion of the International Searching Authority (WO2013/005007) (15 p.).
Examination Report dated May 8, 2015 for European Application No. 12732860.7 (4 p.).
English Translation of Japanese Office Action dated Oct. 29, 2014, for Japanese Application No. 2012-547548 (4 p.).
Search Report dated Oct. 20, 2015, for British Application No. 1111638.11 (4 p.).

* cited by examiner

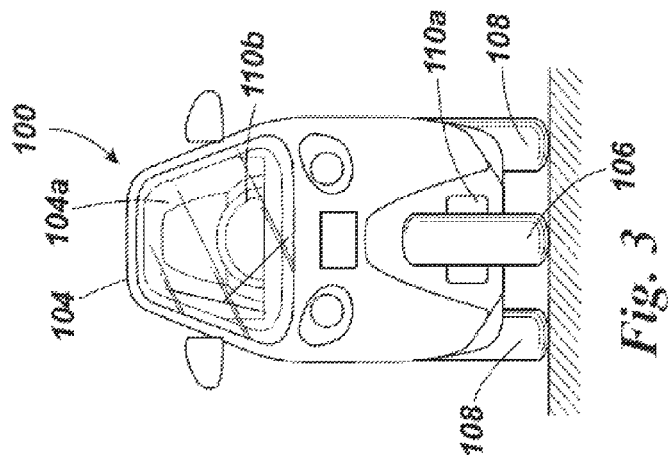
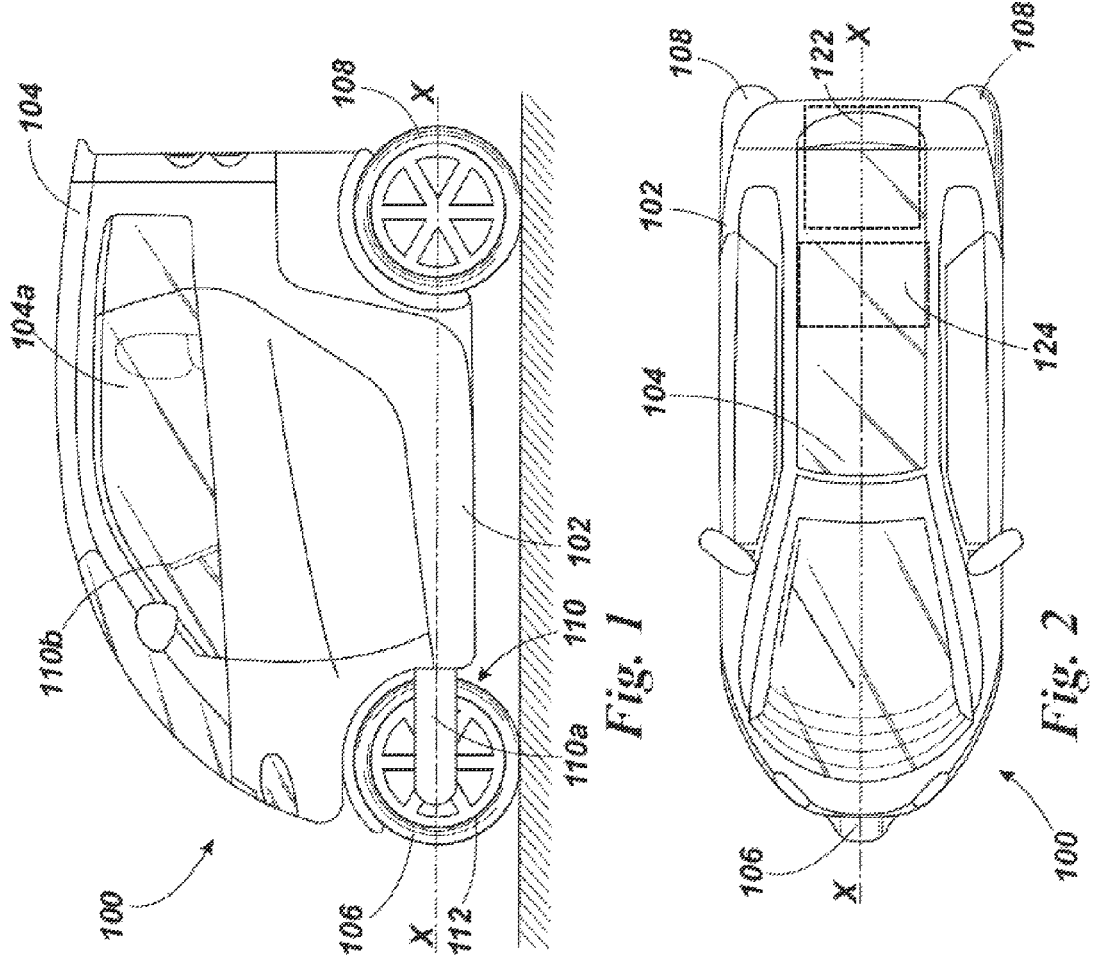

TILTING VEHICLE AND A METHOD OF TILTING A VEHICLE WITH REAR WHEEL SUPPORTS HAVING HYDRAULIC CYLINDERS COMMUNICATING THROUGH A PUMP

CROSS REFERENCE TO RELATED APPLICATIONS

This application is a 35 U.S.C. §371 national stage application of PCT/GB2011/050018 filed Jan. 7, 2011, which claims the benefit of British Patent Application No. 1000244.2 filed Jan. 8, 2010, both of which are incorporated herein by reference in their entireties for all purposes.

STATEMENT REGARDING FEDERALLY SPONSORED RESEARCH OR DEVELOPMENT

Not applicable.

BACKGROUND

Field of the Disclosure

The present invention relates to a vehicle. Particularly, but not exclusively, the present invention relates to a tilting vehicle.

As is well known, the amount of road traffic is increasing annually. Much of the increase is due to the increased numbers of passenger cars. Vehicle manufacturers have responded to these problems in part by offering small ("compact") cars. Steadily increasing fuel prices also encourage the use of small cars. There is a limit to the minimum size for a car having conventional seating, motor and wheel arrangements.

A two wheel motor cycle is an alternative to a conventional four wheel car. However, motor cycles have certain drawbacks including a limited luggage-carrying capacity and poor weather protection and the fact that the motorcycle needs to be supported when stationary.

There have been many proposals for three wheel vehicles, whether with two wheels at the front and one wheel at the back or with one wheel at the front and two wheels at the back. Alternatively, very narrow four wheeled vehicles have also been proposed. In a turn, a vehicle experiences an effective force (the "centrifugal force") which tends to cause the vehicle to roll outwards in a turn. This is not normally a problem in a four wheel vehicle owing to the inherent stability of such vehicles nor is it a particular problem in a motor cycle as the motor cycle is leant into a corner to provide a balance between gravitational and centrifugal forces in a turn.

However, a narrow vehicle with a common hub axle to the rear wheels does not have the inherent stability in a turn of a conventional, wider vehicle. Accordingly, there have been many prior proposals for providing a narrow vehicle which tilts into a corner in order to counteract the centrifugal force.

An example of such a vehicle is shown in US 2008/0238005 to James. This document discloses, in one embodiment, a three-wheeled vehicle having rear cross arms foaming a parallelogram shape which extend across the width of the vehicle between the rear wheels. The vehicle chassis, together with the vehicle rear wheels, can be tilted by skewing the parallelogram-shaped cross arms in one direction or the other to assist the vehicle during cornering.

An alternative construction of tilting vehicle is disclosed in GB 2444250 to Shotter. This document discloses a tilting vehicle having a high centre of gravity with an hydraulic damper arrangement connected to the rear wheels. The hydraulic dampers on each wheel are mechanically connected by a cross bar. In one mode of operation, the dampers operate independently of one another, the tilting operation being achieved through the movement of the cross bar. In another mode of operation, the dampers are interconnected and arranged to move in the same direction to prevent differential movement. GB 2444250 relates to a narrow-track vehicle without a fully-enclosed cabin.

A further alternative construction of tilting vehicle is disclosed in WO99/61302 to Jackson. In one embodiment, a three wheel vehicle is shown and described which has a pair of rear suspension struts, each carrying a rear wheel. The struts provide suspension functions together with enabling the vehicle to tilt.

Other known tilting mechanisms for three wheel vehicles rely on the rider/driver deliberately actuating levers which are connected to a mechanism to make the vehicle tilt; such mechanisms are often heavy and require the driver to learn how to operate the levers as such lever operated mechanisms are not at all intuitive.

Accordingly, there is a perceived need to provide a fully enclosed vehicle which can be small, preferably with three wheels, and which can tilt into a turn either by virtue of a familiar, passive mechanism which is easy and preferably intuitive for the driver to operate, or by intuitive electronic control.

Further, narrow passenger vehicles comprise, by their very nature, extremely limited interior space. In known arrangements, the space between the rear wheels of these vehicles is taken up with the mechanisms to enable the vehicle to tilt. Therefore, there exists a technical problem that known tilting narrow passenger vehicles do not make efficient use of the available space within the vehicle.

According to a first aspect of the present invention, there is provided a vehicle comprising: a chassis, at least one front wheel, two surface-engaging rear wheels and a propulsion unit for driving the rear wheels, each rear wheel being connected to the chassis by a wheel support assembly comprising: a rear wheel support for allowing movement of the respective rear wheel relative to the chassis; and a hydraulic cylinder, the hydraulic cylinder comprising: a housing connected to one of the chassis and the rear wheel support; and a piston connected to the other of the rear wheel support and the chassis, the piston being moveable within the housing and arranged to divide the hydraulic cylinder into first and second chambers each having respective ports arranged to allow hydraulic fluid to enter and exit the respective chamber, the ports of the first chambers of each hydraulic cylinder being in fluid communication and the ports of the second chambers of each hydraulic cylinder being in fluid communication such that movement of hydraulic fluid from the first or second chamber of one hydraulic cylinder to the respective first or second chamber of the other hydraulic cylinder displaces the pistons of the hydraulic cylinders in opposing directions relative to the respective housings and causes the chassis to articulate with respect to the surface, wherein the vehicle further comprises a pump arrangement, the movement of hydraulic fluid being selectively controlled by the pump arrangement.

By providing such an arrangement, the chassis can be caused to tilt or articulate by movement of fluid between the hydraulic cylinders. This arrangement eliminates the need for cross-bracing or support members and enables space-efficient packaging of the internal components of the vehicle such as the propulsion unit, which may be located close to, or between, the rear wheel support assembly.

In one arrangement, at least a part of said propulsion unit is located substantially between the wheel support assemblies or between the rear wheels. This arrangement lowers the centre of gravity of the vehicle, enables space-efficient packaging and aids stability of the vehicle when turning.

In another example, the vehicle further comprises a power source. In a variation, at least a part of the power source is located between the wheel support assemblies or between the rear wheels.

In one arrangement, the propulsion unit comprises an internal combustion engine and the power source comprises a fuel tank. In another arrangement, the propulsion unit comprises an electric motor and the power source comprises at least one battery and/or a fuel cell.

In one example, the wheel support assemblies and chassis are arranged to enable the chassis to tilt up to an angle of substantially 30 degrees in either direction with respect to a vertical, upright position of the chassis. The angle may also be measured with respect the ground surface, if so desired.

In one variation, the propulsion unit, power source and chassis are arranged such that the centre of gravity of the vehicle remains substantially between the rear wheels irrespective of the angle of tilt of the chassis.

In one example, the pump arrangement is electrically operated. In another example, the pump arrangement is a bidirectional pump.

In one example, the vehicle further comprises a control arrangement, the control arrangement comprising a control device to enable the user to steer the vehicle. In one example, said control arrangement is arranged such that, in a first mode of operation, the at least one front wheel is steerable by operation of said control device.

In another example, in said first mode of operation, movement of hydraulic fluid from one hydraulic cylinder to another can be accomplished by application of a force to one side such that the chassis is caused to tilt downwards on the side to which the force is applied.

In a variation, the vehicle further comprises a bypass valve arranged in parallel with the pump arrangement, said control arrangement being arranged, in said first mode of operation, to open said bypass valve to bypass said pump arrangement and to allow the chassis to tilt by said application of force.

In another example, in a second mode of operation, the control arrangement is arranged control said control device such that the vehicle is tiltable in response to operation of said control device. In a variation, in said second mode of operation, the at least one front wheel is free to castor. In another variation, the control arrangement is operable to select automatically one of the first and second modes of operation based upon at least one vehicle parameter.

In an example, said at least one vehicle parameter is selected from the group of vehicle speed, vehicle acceleration, vehicle rate of turn, vehicle direction. In another example, the control arrangement is operable to select the first mode when the speed of the vehicle is below a pre-defined value and to select the second mode when the speed of the vehicle is equal to or exceeds said pre-defined value. In one arrangement, said pre-defined value is in the range of 5-30 km/h. In another arrangement, said first and second modes are selectable by a user.

In one example, the or each front wheel is connected to the chassis by a steerable swing arm member. In a variation, the or each swing arm member is pivotally connected to the chassis at one end and carries a respective front wheel at the other end. In a further variation, a damper is located between said swing arm member and said chassis.

In one example, the or each swing arm member is selectively engagable with said control device to enable the or each front wheel to be steered. In a further arrangement, the vehicle further comprises stop means selectively operable to prevent fluid flow between at least one of the first chambers and the second chambers, thereby selectively to inhibit tilting of the vehicle. In a further example, said stop means comprises a valve.

In a further example, said stop means is controlled automatically by an electronic controller in response to pre-defined vehicle parameters. In a yet further example, said electronic controller comprises accelerometers and said electronic controller is operable to control said stop means based on information from said accelerometers.

In one arrangement, said stop means are operable in response to a manual selection. In one variation, the vehicle further comprises a parking brake, wherein said stop means are operable in response to application of said parking brake. In another variation, each rear wheel support is arranged to provide pivotal movement of the respective rear wheel relative to the chassis. In a further variation, each rear wheel support is arranged to provide vertical pivotal movement of the respective rear wheel relative to the chassis.

In another variation, the rear wheel support for each rear wheel comprises a trailing swing arm pivotally mounted at a first end to the chassis and carrying a rear wheel at a second end. In one example, the connection of at least one of the housings to the rear wheel support or the chassis is via a shock absorber.

In another example, the shock absorber is integral with or rigidly connected to said at least one housing. In a variation, at least one of the pistons is provided by a shock absorber. In a further variation, each trailing swing arm comprises a primary swing arm pivotally connected to the chassis and a secondary swing arm pivotally connected at a first end to the primary swing arm and carrying a rear wheel at the other end.

In a further variation, the hydraulic cylinder for each trailing swing arm is connected between the chassis and the primary swing arm, and comprising a shock absorber connected between the primary swing arm and the secondary swing arm.

In one arrangement, each rear wheel support assembly further comprises biasing means arranged to apply a restoring force between the chassis and the respective rear wheel to oppose the articulation of the chassis. In a further arrangement, said biasing means comprises a spring located between the respective hydraulic cylinder and the chassis or the rear wheel support.

In one arrangement, the vehicle comprises a single front wheel and no more than two rear wheels. In another arrangement, the or each front wheel and said rear wheels are arranged to tilt with said chassis in use.

In one embodiment, the vehicle comprises a single front wheel connected, in use, to the chassis by means of a yoke, at least one damping means being connected between the yoke and the chassis. In one embodiment, the damping means comprises a hydraulic cylinder, said hydraulic cylinder being operable to move the yoke relative to the chassis in use.

In one embodiment, the vehicle comprises two front wheels, each front wheel being connected to the chassis by means of a steering arrangement, wherein the steering arrangement comprises a pair of front hydraulic cylinders, each front hydraulic cylinder comprising: a housing connected to one of the chassis and the steering arrangement; and a piston connected to the other of the steering arrangement and the chassis, the piston being moveable within the housing and arranged to divide the front hydraulic cylinder into first and second chambers each having respective ports arranged to allow hydraulic fluid to enter and exit the respective chamber, the ports of the first chambers of each front hydraulic cylinder being in fluid communication and the ports of the second chambers of each front hydraulic cylinder being in fluid communication such that movement of hydraulic fluid from the first or second chamber of one front hydraulic cylinder to the respective first or second chamber of the other front hydraulic cylinder displaces the pistons of the front hydraulic cylinders.

In one embodiment, the front hydraulic cylinders are in fluid communication with the hydraulic cylinders attached to the rear wheel supports. In an example, the vehicle further comprises a body connected to said chassis and defining an interior space of the vehicle arranged to accommodate a driver. In a variation, said interior space is substantially fully enclosed. In a further variation, an openable door is formed in said body.

In an example, the vehicle comprises a propulsion unit for driving the rear wheels.

In a further example, at least a part of said propulsion unit is located substantially between the rear wheel support assembly or rear wheels. In one arrangement, the propulsion unit comprises an internal combustion engine. In a variation, the vehicle further comprises a fuel tank. In a further variation, at least a part of the fuel tank is located between the rear wheel support assemblies or between the rear wheels. In an alternative arrangement, the propulsion unit comprises an electric motor.

In a variation, the vehicle further comprises a power source. In a further variation, the power source comprises at least one battery. In a further variation, the power source further comprises an on-board fuel cell. In one arrangement, at least a part of the power source is located between the rear wheel support assemblies or between the rear wheels.

In a variation, said hydraulic cylinders comprise hydropneumatic elements. In another arrangement, the drive to the rear wheels from the propulsion unit is a chain or belt or shaft drive.

According to a second aspect of the present invention, there is provided a vehicle, the vehicle comprising: a chassis; at least one front wheel; two rear wheels; each of the rear wheels being connected to the chassis by a respective trailing swing arm pivotally connected to the chassis and providing vertical pivotal movement of the rear wheel relative to the chassis; a shock absorber and a hydraulic cylinder connected in series between each swing arm and the chassis, each hydraulic cylinder having a piston and a housing in which the piston moves, the piston dividing the hydraulic cylinder into upper and lower chambers, each upper and lower chamber having a port through which hydraulic fluid can enter and exit the chamber, the upper chamber ports of the hydraulic cylinders being in fluid communication with each other and the lower chamber ports of the hydraulic cylinders being in fluid communication with each other, such that hydraulic fluid is pumped from an upper chamber of one hydraulic cylinder to the upper chamber of the other hydraulic cylinder and from the lower chamber of the other hydraulic cylinder to the lower chamber of the one hydraulic cylinder when a downwards force is applied to a side of the chassis, thereby causing the vehicle to roll by tipping downwards on said side and upwards on the other side.

In a variation, at least one of the shock absorbers is integral with or rigidly connected to the housing of the hydraulic cylinder with which it is connected in series. In a further variation, the piston of at least one hydraulic cylinder is provided by the shock absorber with which said at least one hydraulic cylinder is connected in series.

The present invention provides a vehicle which can lean into a corner simply by moving hydraulic fluid from one cylinder to another. No complicated bracing arms or structural members are required to accomplish the tilting movement. Similarly, it is not necessary to provide complicated and heavy mechanical linkages as in some known arrangements.

The rear wheel support for each rear wheel preferably comprises a trailing swing arm pivotally mounted at a first end to the frame and carrying a rear wheel at a second end. The connection of at least one of the housings to the rear wheel support or the frame is preferably via a shock absorber. The shock absorber may be integral with or rigidly connected to said at least one housing. Alternatively or additionally, at least one of the plungers may be provided by a shock absorber.

Each trailing swing arm may comprise a primary swing arm pivotally connected to the frame and a secondary swing arm pivotally connected at a first end to the primary swing arm and carrying a rear wheel at the other end. The hydraulic cylinder for each trailing swing arm may be connected between the frame and the primary swing arm, and the vehicle may comprise a shock absorber connected between the primary swing arm and the secondary swing arm.

A valve is preferably selectively operable to prevent fluid flow between at least one of the upper chambers and the lower chambers, thereby selectively to inhibit rolling of the vehicle. This allows the attitude of the vehicle to be fixed when desired, for example to fix the vehicle upright when stationary or moving in a straight line at high speed. In a preferred embodiment, the vehicle comprises a single front wheel and no more than two rear wheels.

According to a third aspect of the present invention, there is provided a vehicle comprising: a chassis, at least one front wheel and two surface-engaging rear wheels, each rear wheel being connected to the chassis by a wheel support assembly comprising: a rear wheel support for allowing movement of the respective rear wheel relative to the chassis; and a hydraulic cylinder, the hydraulic cylinder comprising: a housing connected to one of the chassis and the rear wheel support; and a piston connected to the other of the rear wheel support and the chassis, the piston being moveable within the housing and arranged to divide the hydraulic cylinder into first and second chambers each having respective ports arranged to allow hydraulic fluid to enter and exit the respective chamber, the ports of the first chambers of each hydraulic cylinder being in fluid communication and the ports of the second chambers of each hydraulic cylinder being in fluid communication such that movement of hydraulic fluid from the first or second chamber of one hydraulic cylinder to the respective first or second chamber of the other hydraulic cylinder displaces the pistons of the hydraulic cylinders in opposing directions relative to the respective housings and causes the chassis to articulate with respect to the surface, wherein the vehicle further comprises a pump arrangement, the movement of hydraulic fluid being selectively controlled by the pump arrangement. The vehicle preferably comprises a propulsion unit for driving the rear wheels.

According to a fourth aspect of the present invention, there is provided a vehicle comprising a chassis arranged to tilt, at least one front wheel, two surface-engaging rear wheels, a propulsion unit for driving the rear wheels and a control arrangement comprising a control device for steering the vehicle, the control arrangement being operable: to determine a vehicle parameter; and to select, based upon said vehicle parameter, one of a first and a second mode of operation, wherein in said first mode of operation, the at least one front wheel is arranged to be steerable directly by said control device and said chassis is arranged to be tiltable by movement of a user of the vehicle; and in said second mode of operation, the at least one front wheel is arranged to be free to castor and the control arrangement is arranged to tilt the chassis in response to operation of said control device in order to steer the vehicle.

In one embodiment, the control arrangement is operable to select automatically one of the first and second modes of operation based upon at least one vehicle parameter selected from the group of: vehicle speed, vehicle acceleration, vehicle rate of turn, vehicle direction.

In an embodiment, the control arrangement is operable to select the first mode when the speed of the vehicle is below a pre-defined value and to select the second mode when the speed of the vehicle is equal to or exceeds said pre-defined value. In an embodiment, said pre-defined value is in the range of 5-30 km/h.

In an embodiment, the control arrangement is operable to engage a mechanical or hydraulic connection between the control device and the at least one front wheel when in the first mode of operation, and to disengage said mechanical or hydraulic connection when in the second mode of operation. In an embodiment, the vehicle comprises two front wheels. In an embodiment, each front wheel is connected to the chassis by two pairs of support arms. In an embodiment, a damper is provided between at least one pair of support arms and the vehicle chassis on each side of the vehicle.

In an embodiment, the dampers are connected by a bridging linkage which extends between both dampers.

According to a fifth aspect of the present invention, there is provided method of tilting a vehicle comprising a chassis, at least one front wheel, two surface-engaging rear wheels and a propulsion unit for driving the rear wheels, each rear wheel being connected to the chassis by a wheel support assembly comprising: a rear wheel support for allowing movement of the respective rear wheel relative to the chassis; and a hydraulic cylinder, the hydraulic cylinder comprising: a housing connected to one of the chassis and the rear wheel support; and a piston connected to the other of the rear wheel support and the chassis, the piston being moveable within the housing and arranged to divide the hydraulic cylinder into first and second chambers each having respective ports arranged to allow hydraulic fluid to enter and exit the respective chamber, the ports of the first chambers of each hydraulic cylinder being in fluid communication and the ports of the second chambers of each hydraulic cylinder being in fluid communication; wherein the method comprises: selectively controlling a pump arrangement to move hydraulic fluid from the first or second chamber of one hydraulic cylinder to the respective first or second chamber of the other hydraulic cylinder in order to displace the pistons of the hydraulic cylinders in opposing directions relative to the respective housings and to cause the chassis to articulate with respect to the surface.

According to a sixth aspect of the present invention, there is provided method of steering a vehicle comprising a chassis arranged to tilt, at least one front wheel, two surface-engaging rear wheels, a propulsion unit for driving the rear wheels and a control arrangement comprising a control device for steering the vehicle, the method comprising: determining a vehicle parameter; based upon said vehicle parameter, selecting one of a first and a second mode of operation, wherein in said first mode of operation, the at least one front wheel is steerable directly by said control device and said chassis is tiltable by movement of a user of the vehicle; and in said second mode of operation, the at least one front wheel is free to castor and the control arrangement tilts the chassis in response to operation of said control device in order to steer the vehicle.

In one example, each rear wheel of the vehicle is connected to the chassis by a hydraulic cylinder comprising: a housing and a piston, the piston being moveable within the housing and arranged to divide the hydraulic cylinder into first and second chambers each having respective ports arranged to allow hydraulic fluid to enter and exit the respective chamber, the ports of the first chambers of each hydraulic cylinder being in fluid communication and the ports of the second chambers of each hydraulic cylinder being in fluid communication; wherein the tilting of said vehicle by said user in said first mode of operation comprises moving hydraulic fluid from one hydraulic cylinder to another by application of a force to one side such that the chassis is caused to tilt downwards on the side to which the force is applied.

In another example, in said, in a second mode of operation, the tilting is accomplished by pumping hydraulic fluid from one cylinder another. In a further example, said at least one vehicle parameter is selected from the group of: vehicle speed, vehicle acceleration, vehicle rate of turn, vehicle direction. In a variation, said first mode is selected when the speed of the vehicle is below a pre-defined value and said second mode is selected when the speed of the vehicle is equal to or exceeds said pre-defined value. In a further variation, said pre-defined value is in the range of 5-30 km/h.

According to a seventh aspect of the present invention, there is provided a steering arrangement for a vehicle, the vehicle comprising a chassis, two surface-engaging front wheels, two surface-engaging rear wheels and a propulsion unit for driving the rear wheels, the steering arrangement comprising: a central member movable with the vehicle chassis; a pair of wheel hubs for connection to respective front wheels; two pairs of upper support arms, each pair of upper support arms being pivotably connected to the central member and to a respective wheel hub; two pairs of lower support arms, each pair of lower support arms being pivotably connected to the central member and to a respective wheel hub; two damper assemblies, each damper assembly extending between the central member and at least one of a respective upper or lower support arm; a cross member connected between each damper assembly; and a control device for controlling steering of the front wheels, wherein the steering arrangement is operable to enable steering of the front wheels with said control device and to enable tilting of said front wheels with respect to the ground surface.

In an embodiment, said cross member comprises a one or more arched members comprising two segments joined by a pivotable connection. In an embodiment, said cross member comprises one or more linkage wire and pulley arrangement. In an embodiment, each pair of support arms is connected together at an end adjacent a respective wheel hub. In an embodiment, each pair of support arms is connected together at an end adjacent the central member by a support member to form a triangular shape. In an embodiment, the control device is connected to the wheel hubs by means of one or more pairs of linkage arms.

In an embodiment, the control device is connected to a steering column, the steering column being connected to the linkage arms by means of a gear linkage. In an embodiment, the gear linkage comprises a pair of bevel gears. In one embodiment, the control device is selectively disengageable such that the front wheels are free to castor. In one embodiment, each damper assembly is located at an acute angle to, or parallel to, the ground surface when the vehicle is in the upright position.

According to an eighth aspect of the present invention, there is provided a four wheeled vehicle comprising a steering arrangement according to the seventh aspect.

BRIEF DESCRIPTION OF THE DRAWINGS

Embodiments of the present invention will now be described in detail with reference to the accompanying drawings, in which:

FIG. 1 is a side view of an example of a three-wheeled vehicle;

FIG. 2 is a plan view of the three-wheeled vehicle of FIG. 1;

FIG. 3 is a front view of the three-wheeled vehicle of FIG. 1;

FIGS. 1 to 3 illustrate an example of a narrow, three-wheeled vehicle 100 suitable for transportation in urban environments. The vehicle 100 comprises a chassis 102, a body 104, a surface-engaging front wheel 106 and a pair of surface-engaging rear wheels 108. The vehicle 100 is suitable for carrying up to two passengers in tandem.

DETAILED DESCRIPTION

Figure 4:
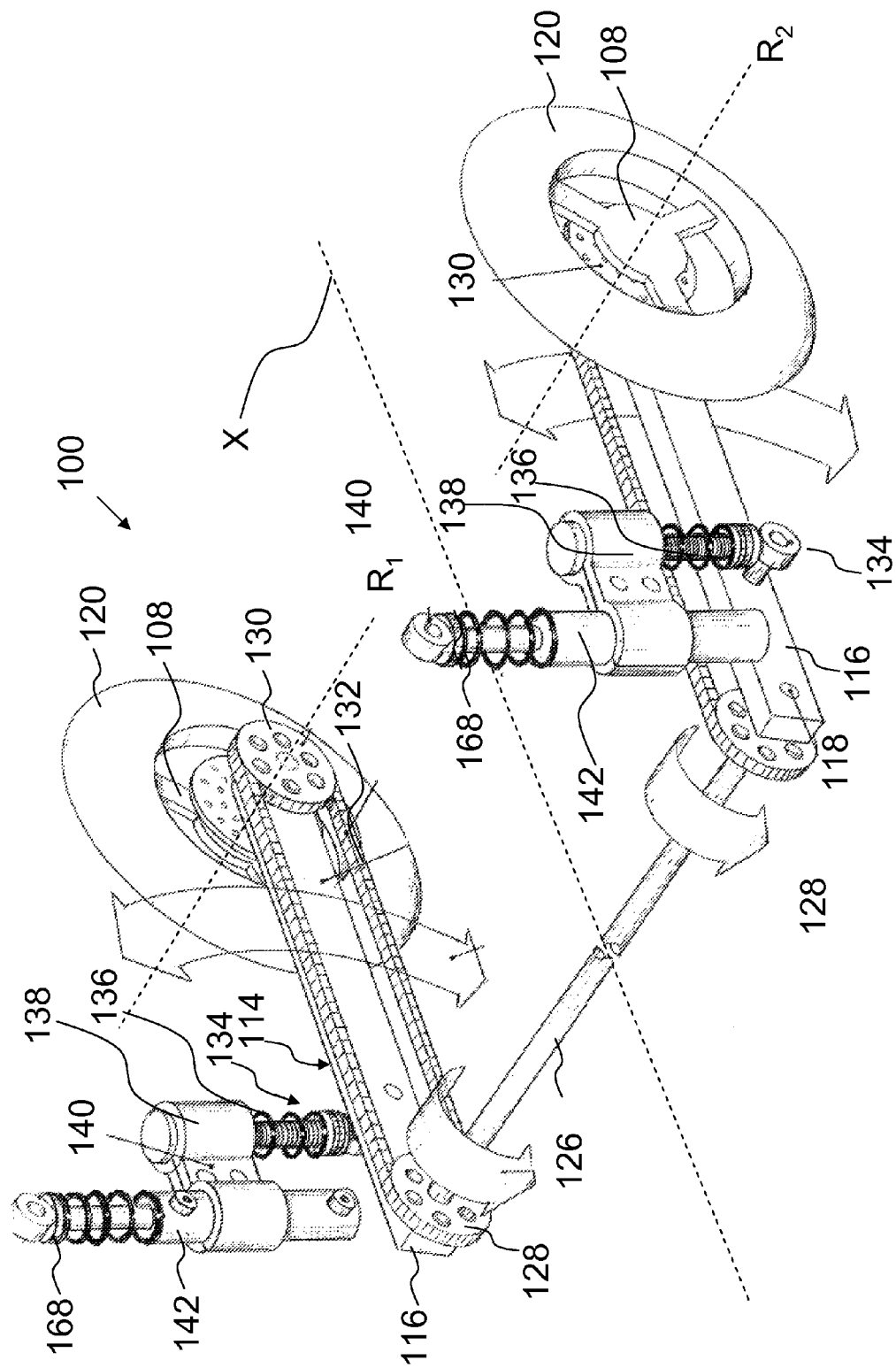
FIG. 4 is a detailed perspective view showing the rear wheels, drive train and suspension of the vehicle of FIG. 1.

The vehicle 100 can have a driver and a passenger seat in tandem with the driver and passenger sitting in-line above the longitudinal axis X-X of the vehicle 100. The body 104 of the vehicle 100 may be entirely enclosed. In other words, the body 104 defines an interior space 104*a* for the driver (and, optionally, a passenger) which is substantially enclosed such that it can substantially protect the occupants from the external environment. To allow ingress to and egress from the vehicle 100, the body 104 may be provided with, for example, two or four conventional side-opening car-type doors (two doors are shown in FIGS. 1 to 3). Optionally, the vehicle 100 may also comprise a vertically-opening tailgate. Alternatively, the vehicle 100 may be a single-seater with a single or pair of doors or hatches.

The vehicle 100 typically might have an overall width of 750 to 900 mm, an overall length of 2000 to 2400 mm and a height of 1400 to 1600 mm. The tyres would typically have an overall diameter of approximately 350 to 450 mm and be 100 to 150 mm wide. However, the overall vehicle length could be as much as 2600 mm and the tyre diameter could be up to 550 mm.

The chassis 102 is rigid and may comprise, for example, a tubular space-frame or monocoque construction. The skilled person will be readily aware of variations that could be made to the frame and which still fall within the scope of the present invention. The chassis 102 may be formed from any suitable material. However, lighter weight materials are preferred; for example, aluminium or carbon fibre.

The chassis 102 comprises a steering arrangement 110 to enable the vehicle 100 to be steered. The steering arrangement 110 comprises a front swing arm 110*a*. The steering arrangement 110, and potential alternatives, will be described later.

The front wheel 106 is mounted for rotation at the front end of the chassis 102. A front tyre 112 carried by the front wheel 106 preferably has a round profile because, as will be discussed further below, the front wheel 106 will lean with the chassis 102 when the vehicle 100 is turning. However, this need not be the case and other tyre and wheel constructions may be utilised.

The steering arrangement 110 comprises a control device 110*b* which may take the form of a handlebar or steering wheel which is manipulable by the driver to cause the front wheel 106 to pivot in order to steer the vehicle. It will be appreciated that alternative steering and suspension mechanisms for the front wheel 106 can be used and which will be described later.

Figure 5:
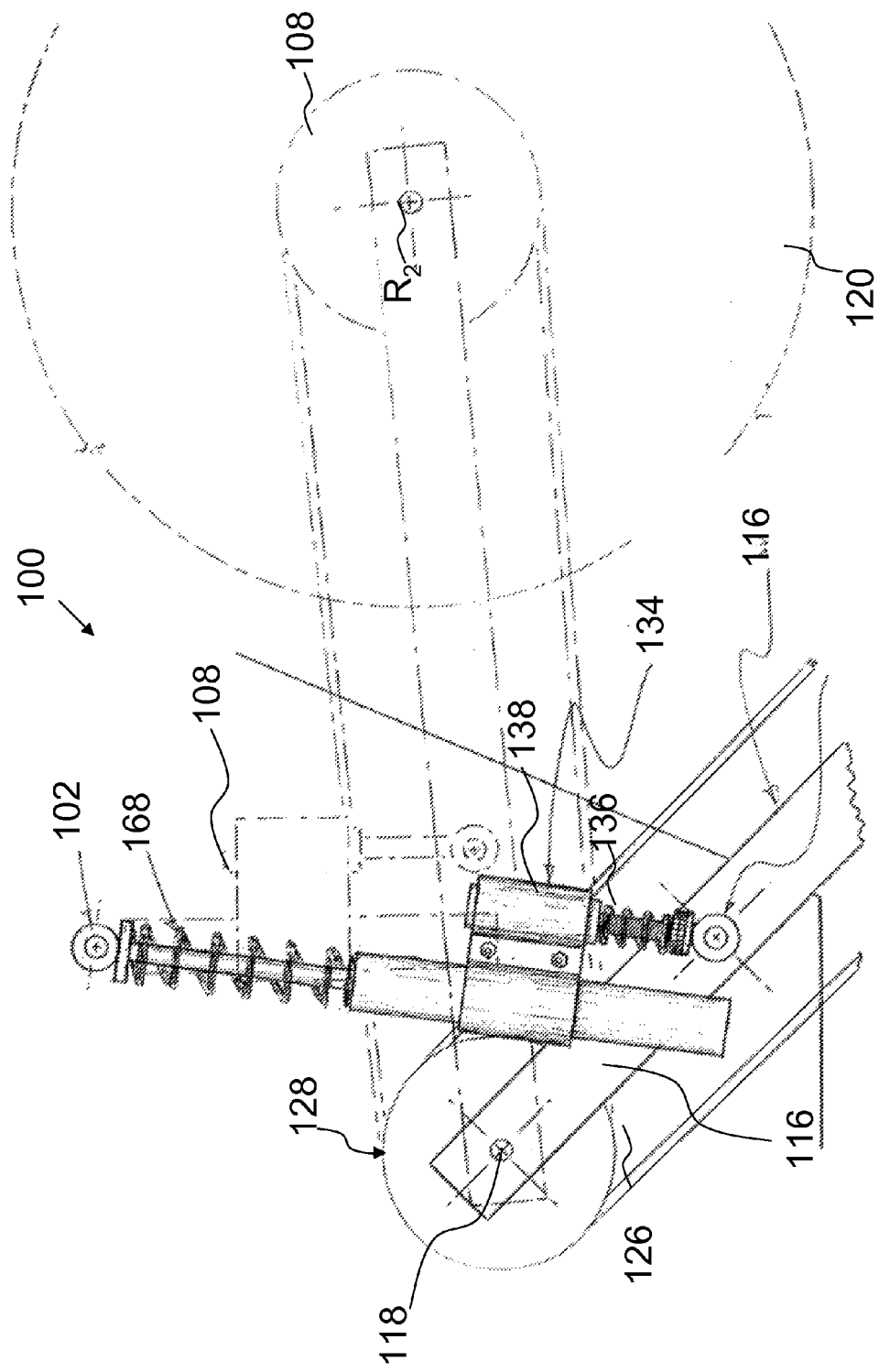
FIG. 5 is a side elevation of a portion of the rear of the vehicle of FIG. 1 showing the rear suspension unit in extended and retracted states.

Two rear wheel support assemblies 114 are shown in FIGS. 4 and 5. The rear wheel support assemblies 114 are located on either side of the rear of the chassis 102. Each rear wheel support assembly 114 comprises a swing arm 116 which is mounted on the side of the rear of the chassis 102. Each swing arm 116 is fixed at one end to a pivot bearing 118 in the chassis 102 so that each arm 116 is cantilevered from the chassis 102 and, furthermore, each arm 116 trails the chassis 102 and lies in a plane parallel to the longitudinal axis X-X of the vehicle 100. Each arm 116 is therefore a trailing swinging arm at the free end of which is rotatably mounted one of the rear wheels 108. A tyre 120 is carried by each of the rear wheels 108 and preferably has a round profile because each of the rear wheels 108 leans into a turn with the chassis 102, as will be discussed further below. Each of the trailing swinging arms 116 can pivot about its bearing 118 so that each rear wheel 108 can move up and down in an arc about the respective bearing 118 as shown by the block arrows in FIG. 4.

A propulsion unit 122 (shown schematically in dotted lines in FIG. 2) is located between the rear wheels 108 and, as such, enables the vehicle 100 to have a low centre of gravity. This assists the vehicle 100 by creating stability during cornering because one of the heaviest components of the vehicle 100 is located partly or entirely between (or at least close to) the axes R1, R2 of the rear wheels 108.

Further, the location of the propulsion unit 122 between the rear wheel support assemblies 114 and between the rear wheels 108 results in space-efficient packaging of the internal components of the vehicle 100. The propulsion unit 122 may be, for example, located beneath a passenger seat of the vehicle 100. The location of the propulsion unit 122 in this manner is possible because the tilting mechanism, unlike known arrangements, does not require any structural members or components to be located between the rear wheels 108 as will be described later.

The propulsion unit 122 may take any suitable form; for example, as an internal combustion engine such as a petrol engine or diesel engine, an electric motor, or a so-called "hybrid engine" (being a combination of an internal combustion engine and an electric motor), is mounted in the chassis 102.

The propulsion unit 122 drives the rear wheels 108. In the case of the propulsion unit 122 being an internal combustion engine, the propulsion unit 122 may also include a gearbox (not shown) which may be integral with the propulsion unit 122 (or engine) or may be located separately from the propulsion unit 122. However, it is desirable that the gearbox is located low down in the chassis 102 of the vehicle 102 in order to provide a low centre of gravity for the vehicle 100. It is also desirable for the gearbox to be located between the rear wheels 108 to provide a compact drive train arrangement.

The propulsion unit 122 also comprises a power source 124 (shown schematically in dotted lines in FIG. 2). The type of power source 124 utilised depends upon the type of propulsion unit 122 used in the vehicle 100. In the case of an internal combustion engine, the power source 124 will take the form of a fuel tank and will desirably be located at the rear of the vehicle 100, such that at least a part of the fuel tank is located between the rear wheel support assemblies 114 or between the rear wheels 108.

If an electric motor or hybrid drive is used as a propulsion unit 122, then the power source 124 may comprise an array of batteries, for example lithium ion batteries. The batteries could be charged in any suitable fashion; for example, by an external power source such as the mains, or by on-board power sources such as a fuel cell or a "range-extender" type small internal combustion engine. Alternatively, a fuel cell may be utilised without a battery source if this is required.

If such on-board power sources are used, then it is preferred that they are located towards the rear of the chassis 102, desirably such that a least a part of the power source 124 is located between the rear wheel support assemblies 114 or between the rear wheels 108

The drive from the propulsion unit 122 to the rear wheels 108 may be by any suitable means. For example, as shown in FIG. 4, an output from the propulsion unit 122 is connected to drive a horizontal transverse drive shaft 126 to each end of which is fixed front drive sprockets 128. The front drive sprockets 128 drive respective rear sprockets 130 mounted on each rear wheel 108 via a respective drive chain or belt 132. It will be noted that the axis of rotation of the horizontal drive shaft 126 is co-linear with the axes of the bearings 118 of the swing arms 116.

As an alternative to the chain or belt drive shown in FIG. 4, each of the rear wheels 108 may be driven by a respective drive shaft running parallel to the swinging arm 116, each drive shaft being driven by the horizontal drive shaft 126.

Each rear wheel support assembly 114 comprises a shock absorber 134 which is provided to control the vertical arcuate movement of each respective swinging arm 116. In the example shown, each shock absorber 134 has a coiled compression spring 136 to absorb the shock of the rear wheel 108 hitting a bump and a hydraulic damper 138 which damps compression and extension of the coil spring 136 in known manner. A gas-filled damper may alternatively be used. In a further alternative, piezoelectric dampers may be used. These dampers utilise piezo-electric elements to lock the dampers when stationary. The piezo-electric material can also be constantly adjusted to change ride dynamics when the vehicle 100 is on the move.

An end of the hydraulic damper 138 of each shock absorber 134 is connected to its respective swinging arm 116. The other end 140 of each shock absorber 134 is rigidly connected to a housing 142 of a respective hydraulic cylinder 144 which also forms part of each rear wheel support assembly 114. As shown in FIG. 4, the other end of the hydraulic cylinder 144 is connected to the vehicle chassis 102.

Figure 6:
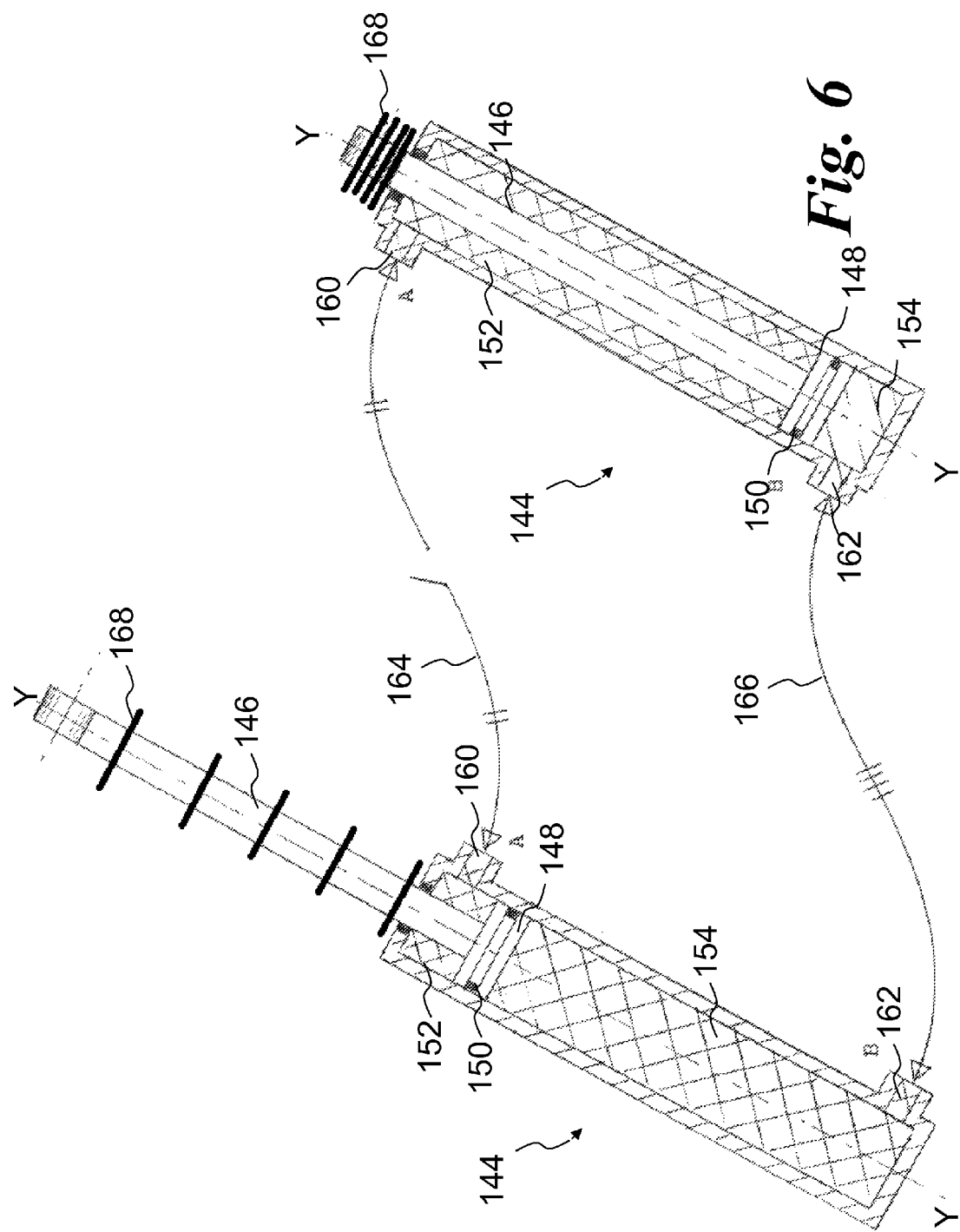
FIG. 6 is a schematic cross-sectional view of the hydraulic cylinders of the example of FIG. 4.

As shown in the simplified illustration shown in FIG. 6, each hydraulic cylinder 144 has a central piston rod 146 which can moveable along an axis Y-Y relative to the housing 142. The lower end of the piston rod 146 has a piston head 148 which sealingly engages the internal wall of the housing 142 by means of an O-ring 150. The piston head 148 and O-ring 150 divides the hydraulic cylinder 144 into a first, upper chamber 152 and a second, lower chamber 154. The volumes of the upper and lower chambers 152, 154 vary as the piston rod 146 moves up and down. The volumes of the upper and lower chambers 152, 154 vary inversely proportionally, i.e. the upper chamber 152 decreases by an amount equal to the amount by which the lower chamber 154 increases when the piston head 148 moves upwardly (relative to the arrangement shown in FIG. 6). Hydraulic fluid 156 fills the whole of the upper and lower chambers 152, 154 of the hydraulic cylinder 144. The hydraulic fluid 156 may be a magnetorheological (MR) fluid such as Filisko.

The end 158 of each piston rod 146 opposite the piston head 148 is connected to the vehicle chassis 102. Thus, each swinging arm 116 is connected to the chassis 102 by means of the series connection of the hydraulic cylinder 144 and shock absorber 134 as well as by the bearing 118 about which the swinging arm 116 pivots.

Each hydraulic cylinder 144 has an upper port 160 through the housing 142 to the upper chamber 152 and a lower port 162 through the housing 142 to the lower chamber 154. As shown in FIG. 1 and indicated schematically in FIG. 5, the upper port 160 of one hydraulic cylinder 144 is connected to the upper port 160 of the other hydraulic cylinder 144 by a flexible hose 164. Similarly, the lower port 162 of each hydraulic cylinder 144 is connected to the lower port 162 of the other hydraulic cylinder 144 by a flexible hose 166. Therefore, a closed loop hydraulic circuit is formed by the flexible hoses 164, 166 and the hydraulic cylinders 144.

The arrangement of the closed hydraulic loop using flexible hoses 164, 166 enables convenient packaging arrangements to be used in the vehicle 100. For example, the space in the vehicle 100 between the rear wheels 108 and hydraulic cylinders 144 can be utilised for the propulsion unit 122 of the vehicle (see FIG. 2) because the flexible hoses 164, 166 can be threaded around such parts of the vehicle 100.

Therefore, in operation, as a piston rod 146 moves down in one hydraulic cylinder 144, the fluid 156 in the lower chamber 154 of that cylinder 27 is pumped via the lower hose 166 to the lower chamber 154 of the other hydraulic cylinder 144. This forces the piston rod 146 of the other hydraulic cylinder 144 to move upwards, thereby pumping hydraulic fluid 156 from the upper chamber 152 of the other hydraulic cylinder 144 through the upper flexible hose 164 to the upper chamber 152 of the first hydraulic cylinder 144. In other words, when the piston head 148 of one hydraulic cylinder 144 moves in a first direction (either upwardly or downwardly), then the piston head 148 of the other hydraulic cylinder 144 moves in an opposing direction. This assists the vehicle 100 in tilting as will be described.

Each hydraulic cylinder 144 also has a coil spring 168 attached between the end 158 of the respective piston rod 148 and the housing 142. The coil spring 168 is arranged to provide a restoring force on each hydraulic cylinder 144. Thereby, in the absence of other forces, the coil springs 168 return the piston heads 148 within the hydraulic cylinders 144 to the same displacement position, naturally returning the vehicle 100 to the upright position.

In order to cause the vehicle 100 to lean into a turn (i.e. to roll about the longitudinal axis X-X of the vehicle 100), hydraulic fluid 156 is moved from either the upper chamber 152 or lower chamber 154 of a first hydraulic cylinder 144 to the corresponding upper or lower chamber 152, 154 of the second hydraulic chamber 144 via either flexible hose 164, 164. Since the hydraulic system is a closed loop and the hydraulic fluid 156 is substantially incompressible, then fluid will move back through the other of the flexible hoses 164, 166 back to the first hydraulic cylinder 144. This movement of hydraulic fluid 156, therefore, causes the piston heads 148 to move differentially in opposing directions and causing the vehicle to tilt with respect to the ground surface.

The movement of the hydraulic fluid 156 can be accomplished in different ways. The preferred method depends upon the vehicle dynamic conditions, such as the vehicle speed, tilt angle, acceleration, cornering force or other suitable parameters. In some situations, the tilting of the vehicle 100 must be handled automatically (for example, at high speed where human error may cause an accident) without direct user input to tilt the vehicle. In other situations, user input (for example, shifting of the user's body weight by leaning) is the preferred method to manoeuvre or steer the vehicle (for example, when at low speed or when reversing/parking).

Consequently, the embodiment of the present invention is arranged to provide different modes of operation for tilting the vehicle.

In a first mode of operation, the driver is able to tilt the vehicle manually by manipulating his/her body weight. In order to tilt the vehicle, the driver of the vehicle 100 leans into the turn so as to shift his or her body weight laterally away from the longitudinal axis X-X of the vehicle 100 in the direction of the desired turn. For example, if the vehicle 100 is to enter into a left hand turn, the driver leans to the left. This transfer of body weight over the left side of the vehicle 100 causes the piston rod 146 of the left hand hydraulic cylinder 144 to depress, forcing hydraulic fluid 156 out of the lower chamber 154 of that hydraulic cylinder 144 through the lower hose 166 and into the lower chamber 154 of the right hand hydraulic cylinder 144.

This in turn causes the piston rod 146 of the right hand cylinder 144 to move upwards with a consequent transfer of hydraulic fluid 156 from the upper chamber 152 of the right hand cylinder 144 to the upper chamber 152 of the left hand cylinder 144. Because of the compression of the overall length of the left hand hydraulic cylinder 144, the left hand swinging arm 116 moves upwards relative to the chassis 102, thereby tipping the left side of the chassis 102 downwards.

Similarly, the extension of the right hand hydraulic cylinder 144 forces the right hand side of the chassis 102 upwards with the right hand swinging arm 116 pivoting relatively downwards about its bearing 118. Thus, the vehicle 100 leans by the appropriate amount, which is adjustable by the amount of lean of the driver, assisting the shift of body weight of the driver and also distributing the vehicle weight more evenly between the two rear wheels 108. In addition, as will be understood by those skilled in the art, the vehicle 100 can also be caused to lean by applying appropriate forces parallel to the longitudinal axis X-X to the control device such as a handlebar. Thus, the vehicle 100 can be caused to lean in a controllable manner entirely passively without the use of any active control system (such as computer or other electronic control) and without the heavy and complex semi-active lever linkages of some known arrangements, some of which require operation of foot pedals by the driver in order to cause the vehicle to lean.

The movement of the piston rod 146 in the housing 142 of the hydraulic cylinder 144 and the movement of the swing arm 116 is illustrated further in FIG. 6. The fully extended configuration of the hydraulic cylinder 144 is shown in the left-hand hydraulic cylinder 144 in FIG. 6 and the fully compressed configuration of the hydraulic cylinder 144 is shown by the right-hand hydraulic cylinder 144 in FIG. 6.

Figure 7:
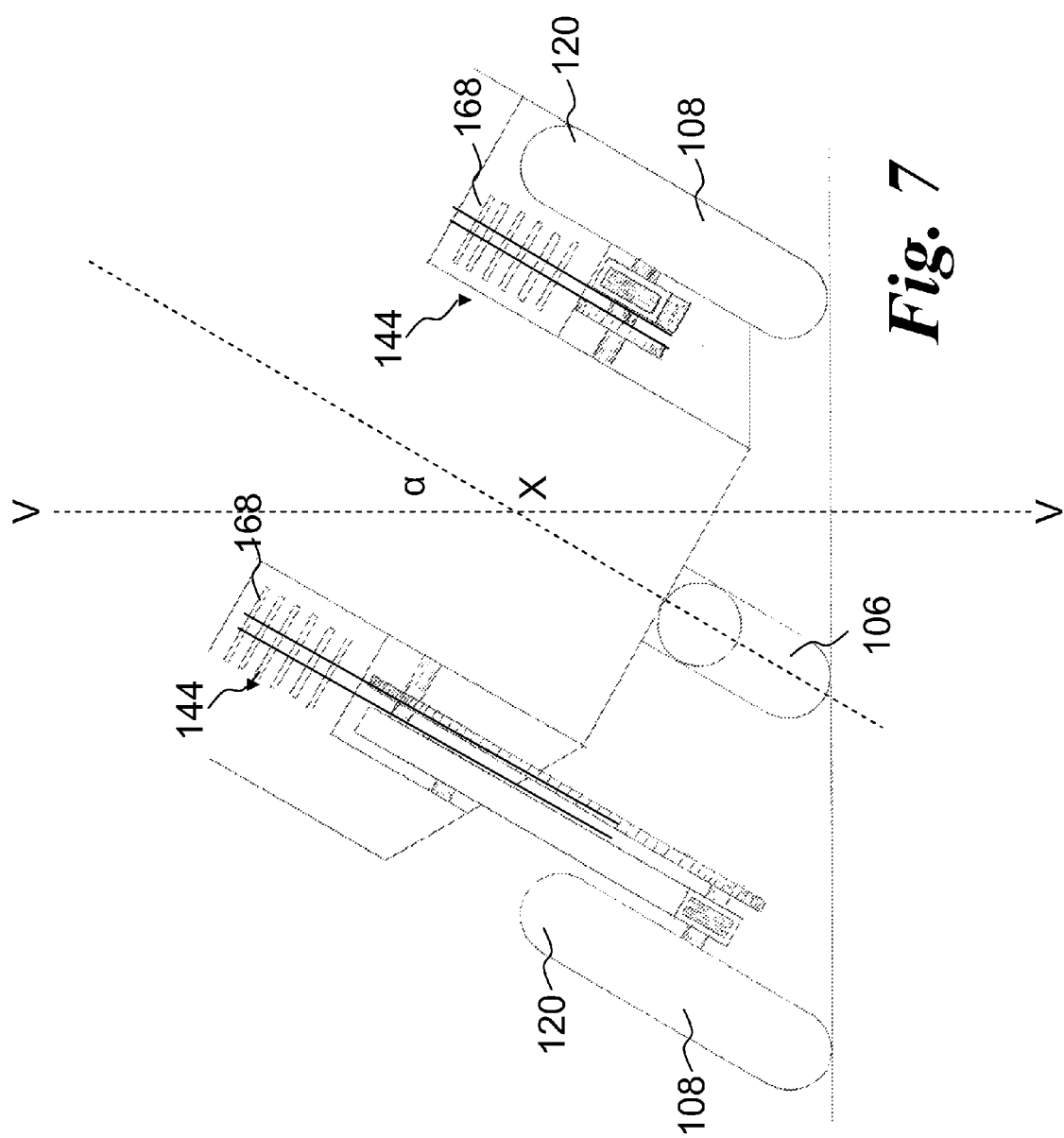
FIG. 7 is a rear view of the vehicle of FIG. 1 tilting in a turn.

FIG. 7 shows the vehicle 100 from the rear when leant over to the right for a right hand turn. The right hand hydraulic cylinder 144 is fully compressed so that the right hand side of the vehicle 100 tips downwards towards the ground. The left hand hydraulic cylinder 144 is fully extended, pushing the left hand side of the vehicle 100 upwards.

It can also be seen from this figure that the arrangement of the propulsion unit 122 and power source 124 low down in the chassis 102 assists in maintaining the centre of gravity of the vehicle 100 between the rear wheels 108. This is maintained irrespective of the angle of tilt of the chassis 102 of the vehicle 100, aiding stability of the vehicle 100 and preventing the vehicle 100 from toppling over in a turn. The stability of the vehicle 100 is further assisted by the location of at least a part of each of the propulsion unit 122 and power source 124 lies between the wheel assemblies 114 in both lateral and longitudinal directions, which aids stability. The centre of gravity should also be low down in the vehicle 100, preferably no more than 450 mm above the ground surface.

It can also be seen from FIG. 7 that, in a turn, all of the wheels 106, 108 of the vehicle 100 tilt with the chassis 102. This is the reason for the curved profile on the tyres of the vehicle and maintains a compact tilting arrangement.

The chassis 102 of the vehicle 100 is arranged to articulate or tilt. The angle of tilt α is measured relative to the upright, vertical position (shown by axis V-V in FIG. 7) and the vehicle 100 can tilt up to and including an angle of 30 degrees away from the vertical, upright position V-V. This enables the vehicle 100 to turn sharply, whilst maintaining stability and engagement of the rear wheels 108 with the surface. Due to the inherent stability of the vehicle 100 afforded by the low centre of gravity, the angle α is much greater than that of known arrangements. However, other maximum angles of tilt α may be used as appropriate. For example, even though the vehicle 100 may be capable of higher angles of tilt, the vehicle 100 may be limited to a predefined, lower angle for safety purposes.

Figure 8:
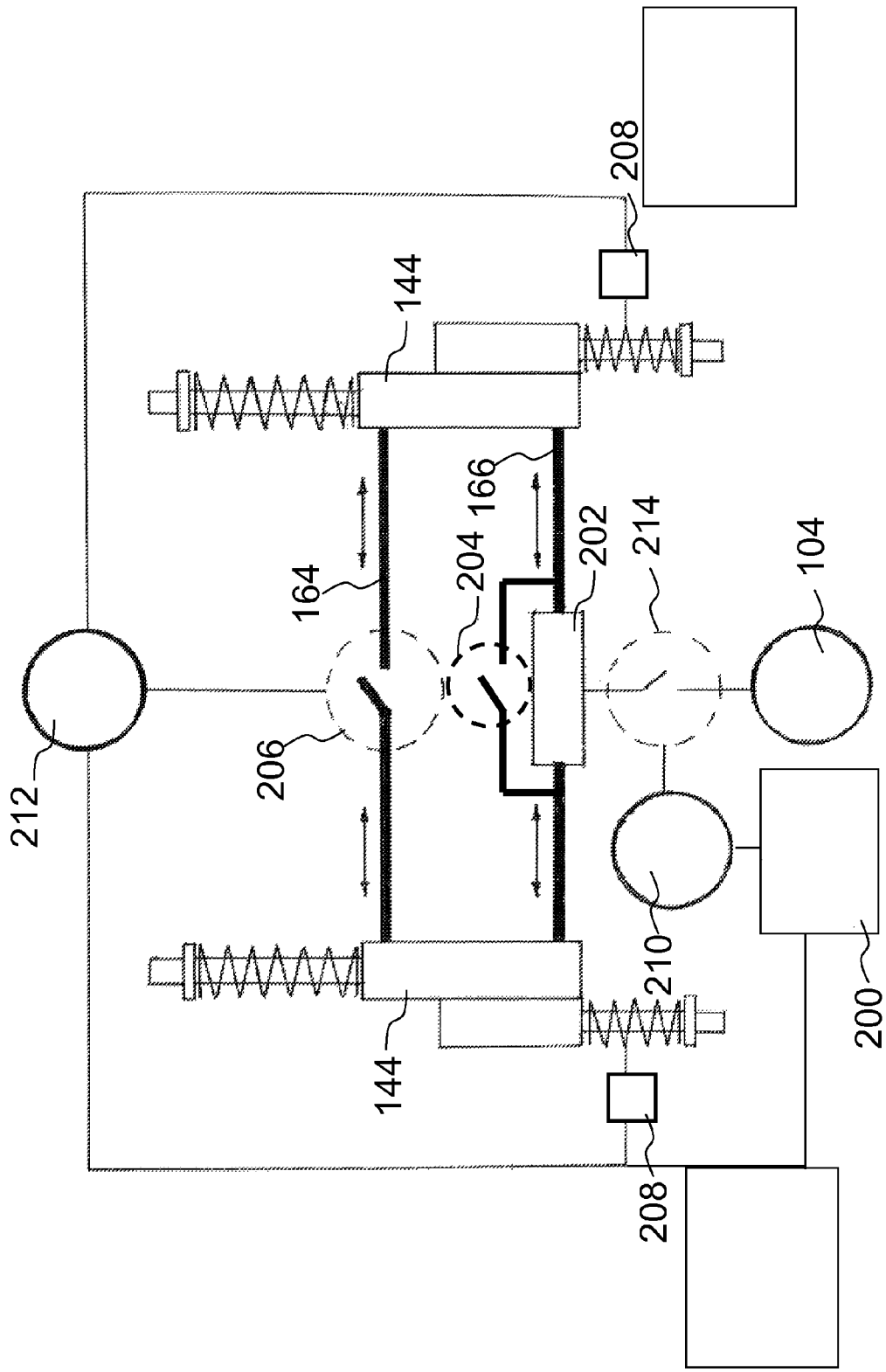
FIG. 8 is a schematic diagram of a control arrangement for controlling the hydraulic cylinders of FIG. 6.

The hydraulic arrangement of the present invention also has a second mode of operation. In the second mode of operation, the tilting of the vehicle 100 is accomplished automatically and not by movement of the driver's body weight. FIG. 8 illustrates a schematic diagram of a control arrangement 200 to achieve this.

The control arrangement 200 comprises, for example, a microprocessor and is operable to control the hydraulic cylinders 144 and shock absorbers 134 to control the leaning of the vehicle. The control arrangement 200 controls a pump arrangement 202, a bypass valve 204, a valve 206 and damper controllers 208 associated with each shock absorber 134. In order to provide vehicle dynamics information to the control arrangement 200, first and second accelerometers 210, 212 are provided. The accelerometers 210, 212 may be located in any suitable place on the vehicle 100 and may communicate with the control arrangement through any suitable communication means, for example, wires or through wireless communication using, for example, a short range wireless network.

The accelerometer 210 is preferably located on the steering arrangement 110 in order to provide the current position of the control device (such as a steering wheel or handlebars as shown in FIG. 2) to the control arrangement 200. In this arrangement, wireless communication between the control arrangement 200 and the accelerometer 210 is beneficial to remove the need for wires between these components, reducing weight and mechanical wear.

The control arrangement 200 also controls a steering arrangement lock out 214. In addition, the control arrangement 200 also has access to information such as vehicle speed (through, for example, a speedometer).

In the second mode of operation, the movement of hydraulic fluid 156 within the closed hydraulic loop and between each of the hydraulic cylinders 144 is controlled by the pump arrangement 202. The pump arrangement 202 is located in communication with the flexible hose 166. However, other arrangements may be used. Any suitable type of pump may be used. However, a bidirectional pump; for example, a helical screw pump is preferred. Alternatively, the pump arrangement 202 may comprise more than one pump. The pump arrangement 202 is controlled by the control arrangement 200.

Located in parallel with the pump arrangement 202 is a bypass valve 204. The bypass valve 204 may take any suitable form of valve which is at least bistable in nature, i.e it can be opened or closed. A variable-opening valve may also be used. An example of suitable valve may be a solenoid valve. The bypass valve 204 is controlled by the control arrangement 200. The bypass valve 204 is able to open in order to enable the vehicle to be operated in the first mode of operation, i.e. the vehicle can be tilted by movement of the driver's body laterally away from the longitudinal axis X-X.

In the first mode of operation, the pump arrangement 202 is bypassed and hydraulic fluid 156 is able to flow through the bypass valve 204. The control arrangement 200 selects the first mode of operation automatically when it is determined that the speed of the vehicle 100 is below a pre-determined value, for example below 25 km/h, preferably below 15 km/h, more preferably below 5 km/h or when the vehicle is reversing. In this mode of operation, the steering arrangement lock out 214 is not engaged, and so the driver can steer the front wheel 106 of the vehicle 100 using the control device 110b. Also, at these speeds, the driver is able to steer the vehicle 100 safely by leaning to, for example, weave in and out of traffic or perform a reversing maneuver.

Alternatively, the first mode of operation may be selectable by the driver and the second mode of operation will be the default mode of operation unless the first mode is explicitly selected by the driver by, for example, a button on the control device 110b.

However, in the second mode of operation, the control arrangement 200 closes the bypass valve 204 and so the movement of hydraulic fluid 156 is governed by operation of the pump arrangement 202. This is done at higher speeds above approximately 15 km/h. In the second mode of operation, the steering arrangement lock out 214 is also activated so the steering arrangement 110 no longer directly steers the front wheel of the vehicle 100. Instead, the front wheel of the vehicle is free to castor and, when the driver turns the control device 110b, the accelerometer 210 detects the movement of the control device 110b and communicates a control signal to the control arrangement 200. In response to the signal from the accelerometer 210, the control arrangement 200 operates the pump arrangement 202 to pump hydraulic fluid 156 in the appropriate direction to lean the vehicle 100 in the direction in which the driver intends to move (as indicated by the direction in which the driver moves the control device 110b).

The control arrangement also controls the valve 206. The valve 206 is located along the flow path of the other flexible hose 164 (although other arrangements may be used) and is configured to function as a lock to break the closed loop hydraulic fluid circuit. This is used to provide stability to the vehicle 100 when stationary. With the valve 206 open, hydraulic fluid 156 can flow between the hydraulic cylinders 144, allowing the vehicle 100 to be leant over as required. With the valve 206 closed, hydraulic fluid 156 cannot flow between the hydraulic cylinders 144, meaning that the angle of lean of the vehicle 100 is fixed.

This means that the vehicle 100 can be parked in a stable upright position. The vehicle 100 can even be parked upright on a cambered road by setting the amount of lean appropriately to take account of the lean before operating the valve 206. The valve 206 can be operated when the vehicle is moving at relatively high speed in order to prevent the vehicle from tipping at speed if desired. The control arrangement 200 may be configured to close the valve 206 when the vehicle parking brake (not shown) is applied. A switch (not shown), which may conveniently be mounted on or near the control device 110b, can be operated to open or close the valve 206 as required.

The control arrangement 200 is also operable to control the damping of the shock absorbers 134 through the damper controllers 208. The damper controllers 208 provide the ability to modify the damping characteristics of the shock absorbers 134. The rate and/or level of damping could be adjustable depending on the surface on which the vehicle 100 is being driven, or alternatively the shock absorbers 134 could "lock" and become extremely stiff to provide stability when the vehicle 100 is stationary and, for example, the driver and/or passenger is entering or exiting the vehicle 100. The damper controllers 208 may use a variety of suitable techniques to achieve adjustable damping; for example, piezoelectric dampers or through the use of a magnetorheological (MR) fluid such as Filisko.

Variations on the above control arrangement are possible. For example, alternative accelerometer arrangements could be used. In possible arrangements, a number of accelerometers could be used: a) To measure, in both first and second modes, when the vehicle has stopped b) to measure, in both first and second modes, the vehicle acceleration (in both forward and reverse directions); b) to sense up/down movements on the rear wheels such that the dampers could be automatically adjusted and/or c) to indicate or sound an alarm when the chassis 102 is close to, or reaches, the maximum 30 degree tilt.

Figure 9:
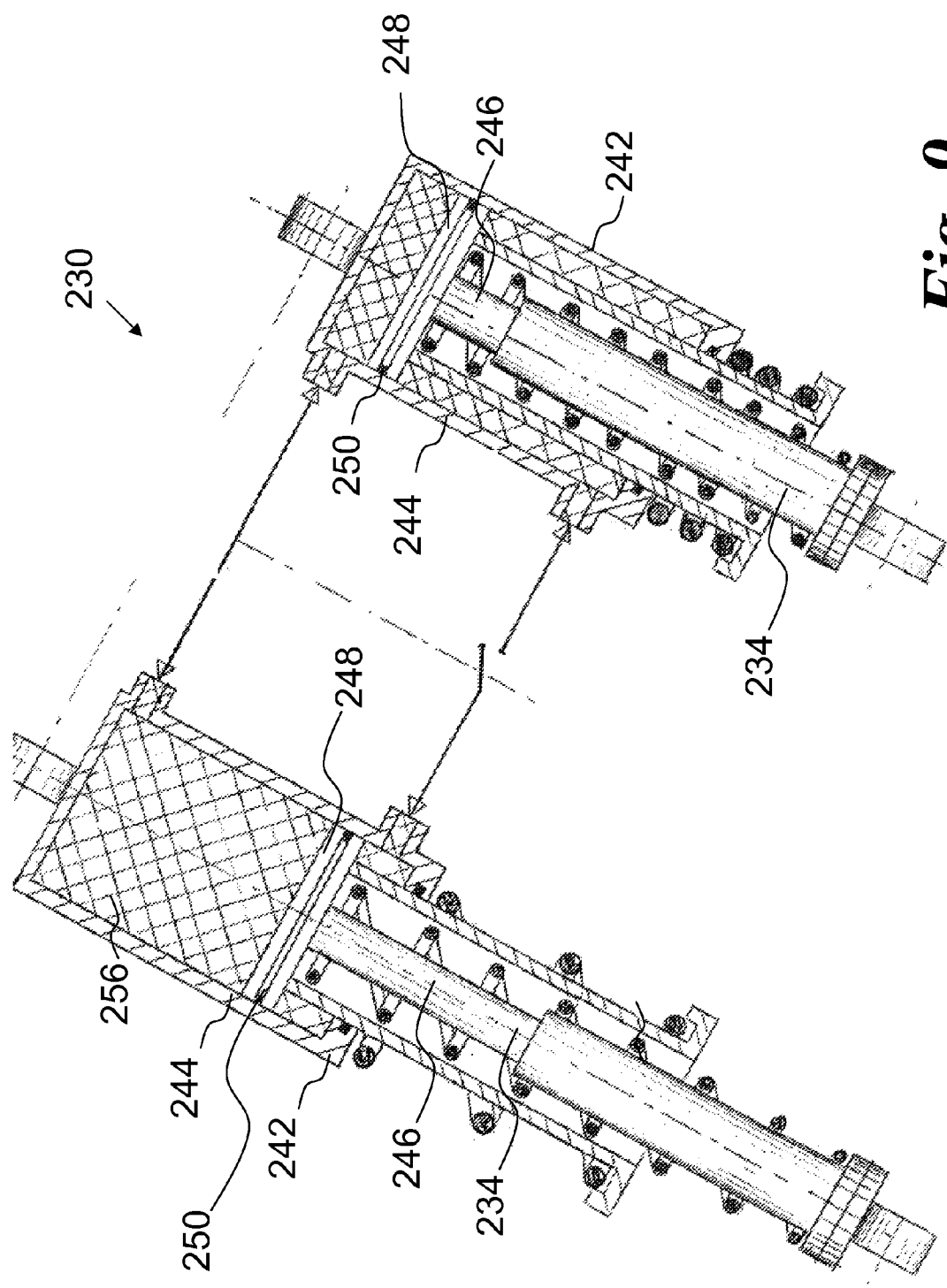
FIG. 9 is a schematic cross-sectional view showing the operation of another example of rear suspension units.

An alternative construction 230 for the hydraulic cylinders and shock absorbers is shown in FIG. 9. In this example, the shock absorber 234 is integral with the hydraulic cylinder 244 and mounted internally of the housing 242 of the hydraulic cylinder 244 and, furthermore, provides the piston rod 246 of the hydraulic cylinder 244. As such, the shock absorber 234 carries a piston head 248 at its end within the housing 242.

The piston head 248 sealingly engages with the internal wall of the housing 242 by means of an O-ring 250. In this example, the housing 242 of the hydraulic cylinder 244 is connected to the chassis 102 and the piston rod 246 formed by the shock absorber 234 is connected to the swing arm 116. Thus, in a left hand turn for example, when the driver leans over to the left, hydraulic fluid 256 is pumped out of the upper chamber 252 of the left hand hydraulic cylinder 244 to the upper chamber 252 of the right hand hydraulic cylinder 244 and from the lower chamber 254 of the right hand hydraulic cylinder 244 to the lower chamber 254 of the left hand hydraulic cylinder 244. In other respects, the operation of the integral hydraulic cylinders 244 and shock absorbers 234 of FIG. 9 is similar to that of the hydraulic cylinders 144 shown in FIG. 6 and described above.

An expansion tank (not shown) can be provided for the hydraulic fluid 256 with access to the expansion tank being provided to enable the hydraulic fluid 256 to be topped up as necessary.

Figure 10:
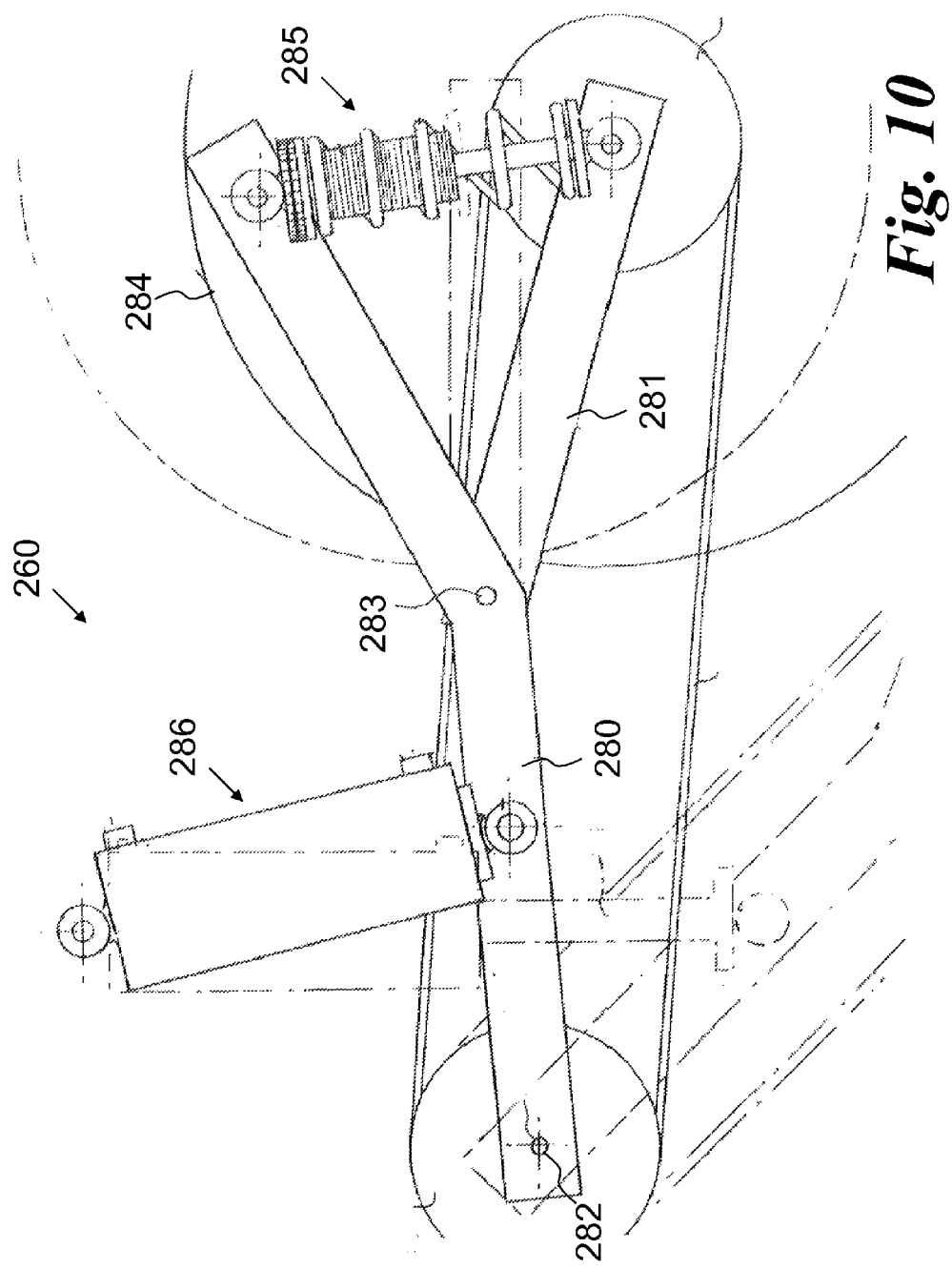
FIG. 10 is a schematic side elevation of another example of the rear wheel suspension.

An alternative arrangement 260 for the rear suspension is shown in FIG. 10. In this example, each swinging arm 116 for the rear wheels 108 is in two parts, a primary swing arm 280 and a secondary swing arm 281. The primary swing arm 280 is fixed at one end to the pivot bearing 282 in the chassis 102. The primary swing arm 280 is kinked upwards part way along its length by an angle of approximately 25°. A first end of the secondary swing arm 281 is pivotally connected to the primary swing arm 280 by a bearing 283 at the kink in the primary swing arm 280. The secondary swing arm 281 carries a rear wheel 284 at its other end. The shock absorber 285 is connected between the secondary swing arm 281 and the upwardly kinked portion (i.e. the rearmost portion) of the primary swing arm 280. Shock absorption of bumps is achieved by movement of the secondary swing arm 281 relative to the primary swing arm 280 and consequent damped compression of the shock absorber 285. The hydraulic cylinder 286 is connected between the chassis 102 and the primary swing arm 280. Leaning of the vehicle 100 is achieved as described above. The driver moves his or her bodyweight over the side of the vehicle that is to move downwards with consequential pumping of hydraulic fluid between the hydraulic cylinders 286 and movement of the primary swing arm 280 relative to the chassis 102. Alternatively, a pump, such as the pump arrangement 202 shown in FIG. 8, may be used.

The shock absorbers 134; 285 may be damped using "Filisko" or similar Magnetorheological fluid, the viscosity of which can be adjusted by application of different electrical voltages. The shock absorbers 134; 285 in this case can be locked in position by passing an electrical charge through the Filisko damping fluid, further to increase stability when the vehicle 100 is stationary for example. The hydraulic fluid in the hydraulic cylinders 144; 286 may be "Filisko" or similar fluid, the viscosity of which can be adjusted by application of different electrical voltages.

Figure 11:
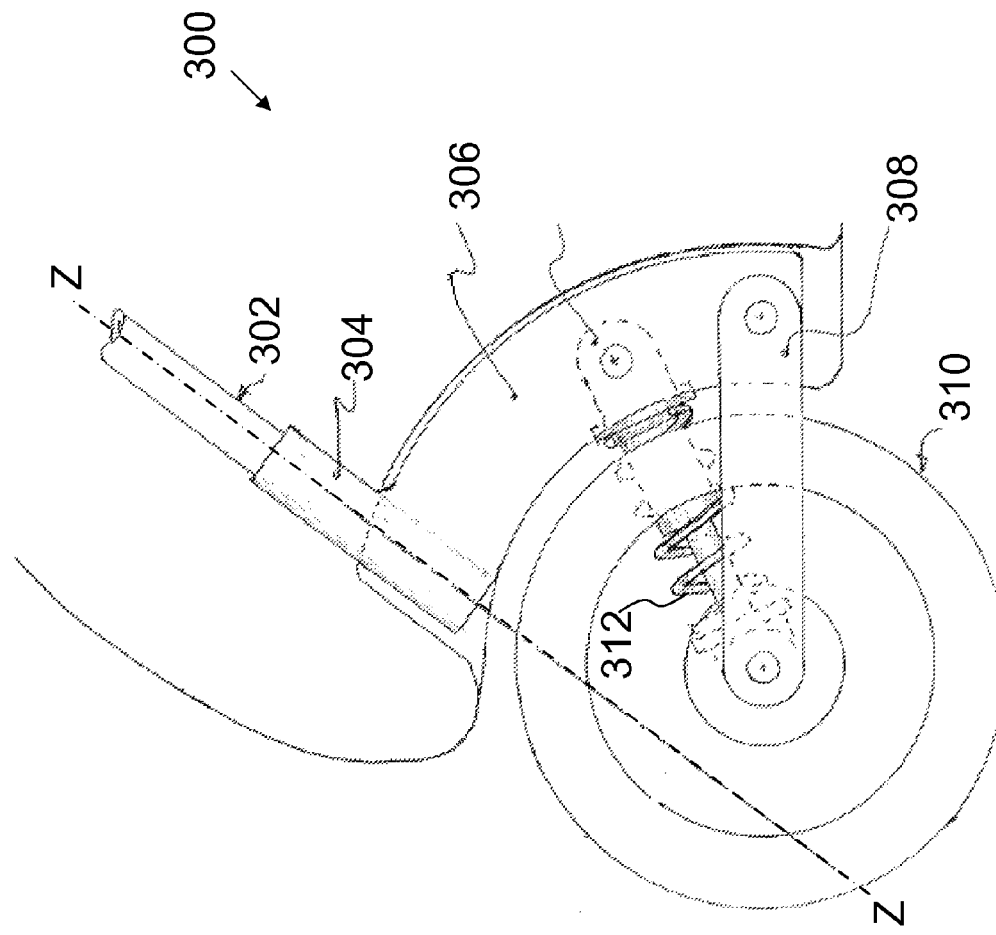
FIG. 11 is a schematic side view of a front wheel assembly suitable for use with the vehicle of FIG. 1.
Figure 12:
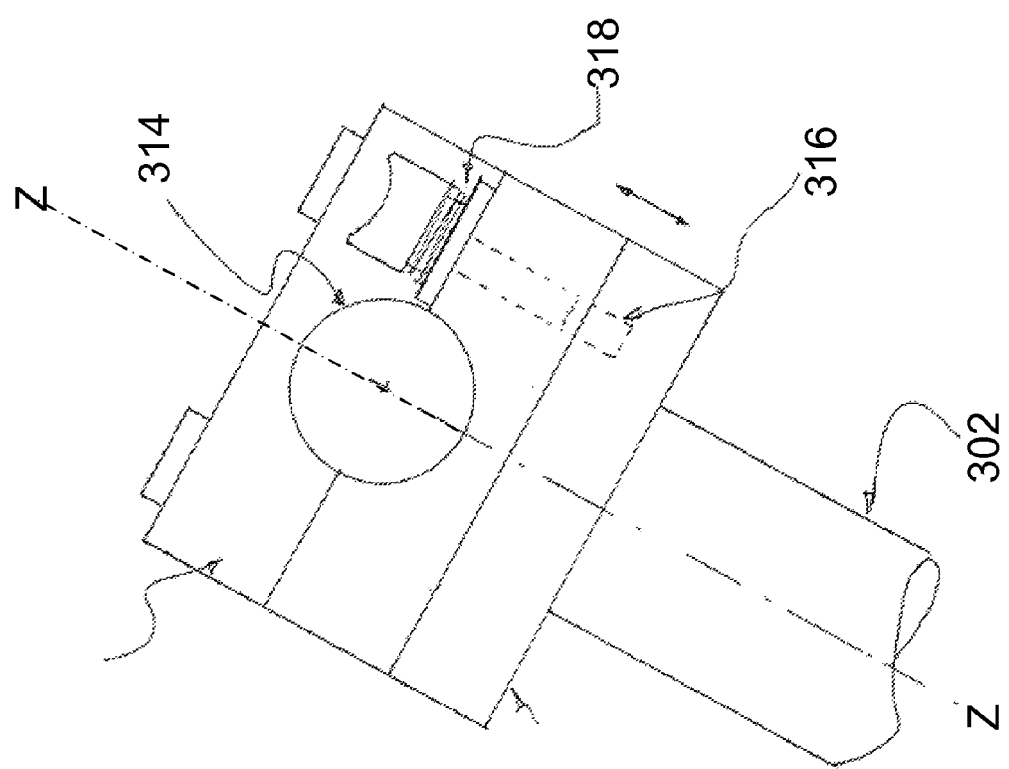
FIG. 12 is a schematic view of part of the assembly of FIG. 11.

FIGS. 11 and 12 show a possible arrangement of the front wheel of the vehicle 100 which is suitable for use with the control arrangement 200 of FIG. 8. FIG. 11 shows a steering arrangement 300 which comprises a steering column 302, a kingpin 304 and a steering yoke 306. A front swing arm 308 is connected to the steering yoke 306 and the front swing arm is, in turn, connected to a front wheel 310 which is rotatably secured at an end thereof. A shock absorber 312 is connected between the front swing arm 308 and the steering yoke 306, i.e. in practice the shock absorber (or damper) 312 is connected between the front swing arm 308 and the chassis 102. The shock absorber 312 may optionally be controlled by a damper controller similar to that described above. As can be seen in FIG. 9, the centreline of the kingpin Z-Z passes forwardly of the centre of the front wheel 310. This enables the front wheel 310 to castor.

Referring to FIG. 12, a mechanism for disengaging the steering of the vehicle 100 to enable free to castor operation (i.e. the first mode of operation) is shown. At the upper end of the steering column 302 is located a control device 314 in the form of a handlebar. The handlebar and the steering column 302 are interconnected by means of a locking pin 316 controlled by a sprung button 318. The button 318 optionally allows engagement/disengagement of the steering column 302 and handlebars. The locking pin 316 is also operable by a solenoid controlled by the control arrangement 200 in order to enable switching between the first mode of operation (in which the front wheel 310 is directly controllable by the control device 314), and the second mode of operation (in which the front wheel 310 and front swing arm 308 is free to castor and steering is accomplished by tilting of the chassis 102). In other words, the locking pin 316 is able to selectively engage/disengage the mechanical link between the steerable, pivotable front swing arm 308 and the control device 314.

Figure 13:
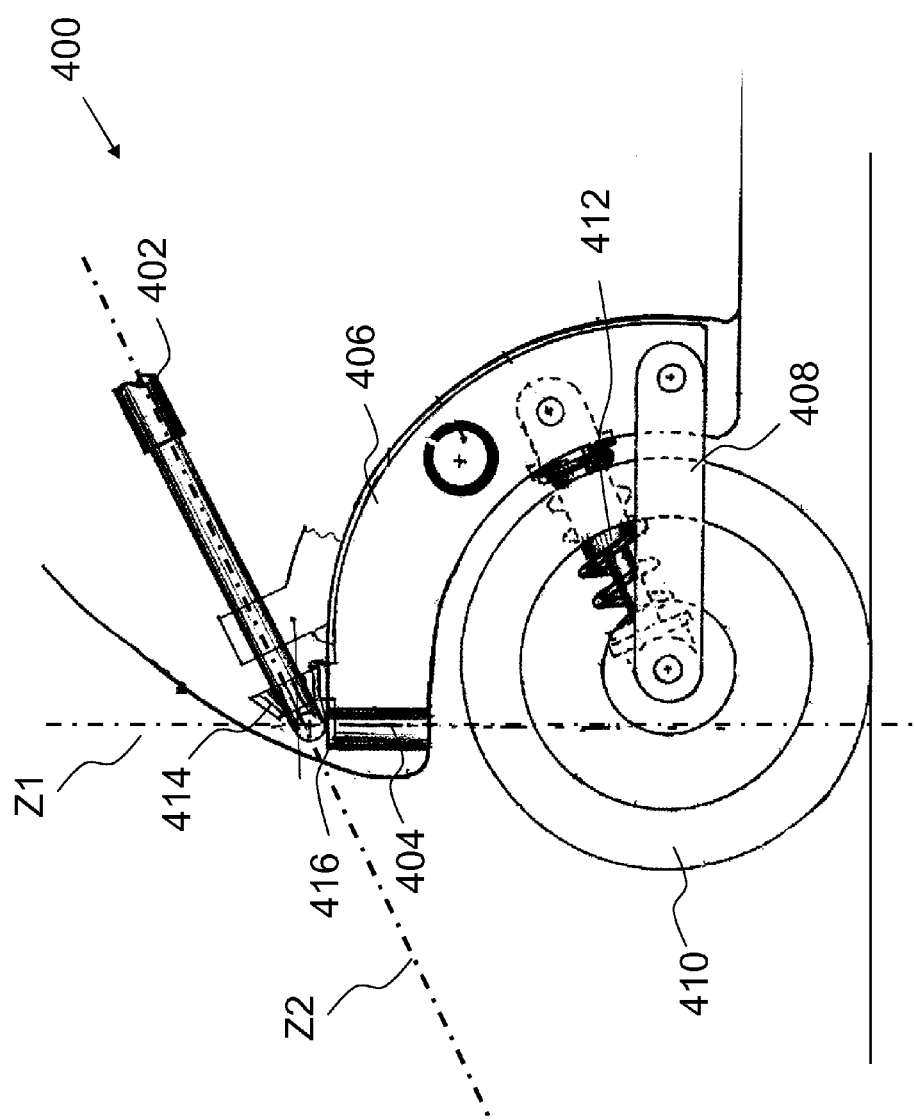
FIG. 13 is a schematic side view of an alternative front wheel assembly suitable for use with the vehicle of FIG. 1.

FIG. 13 shows an alternative arrangement of the front wheel of the vehicle 100 which is suitable for use with the control arrangement 200 of FIG. 8. FIG. 13 shows a steering arrangement 400 which comprises a steering column 402, a kingpin 404 and a steering yoke 406. A front swing arm 408 is connected to the steering yoke 406 and the front swing arm is, in turn, connected to a front wheel 410 which is rotatably secured at an end thereof. A shock absorber 412 is connected between the front swing arm 408 and the steering yoke 406. The shock absorber 412 may optionally be controlled by a damper controller similar to that described above. As can be seen in FIG. 11, the centreline of the kingpin Z1 passes forwardly of the centre of the front wheel 410. This enables the front wheel 410 to castor.

In this embodiment, steering of the vehicle is effected by means of a bevel gear 414 located at a distal end of the steering column 402 which engages with a complementary bevel gear 416 located on the yoke 406. The mechanical link between the front wheel 410 and the steering column 402 can be engaged or disengaged as required by means of a locking pin as described in relation to the previous embodiment. In the embodiment of FIG. 13, the steering linkage (comprising the bevel gears 414, 416) is located directly above the centreline of the wheel 410. However, this need not be so. The steering linkage may be located forwardly or rearwardly of the centreline of the wheel 410 as is required. Further, whilst bevel gears 414, 416 are shown in FIG. 13, alternative mechanisms such as a worm gear or rack and pinion may be used.

Additionally, the steering column 402 is operable to telescope back and forth along the axis Z2, the steering column can be adjusted to suit individual drivers.

Figure 14:
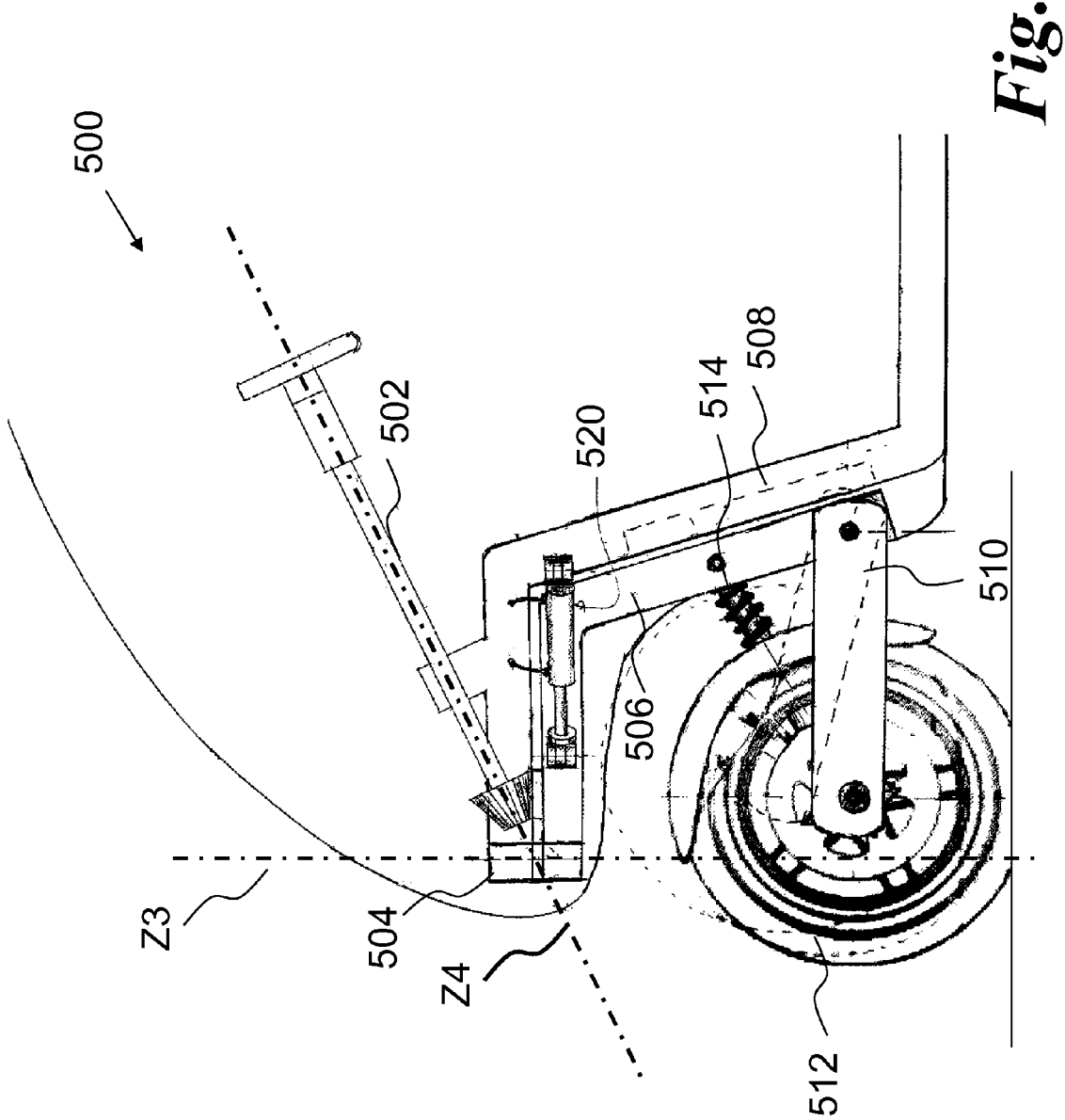
FIG. 14 is a schematic side view of a further alternative front wheel assembly suitable for use with the vehicle of FIG. 1.

FIG. 14 shows a further alternative steering arrangement 500 suitable for use with the control arrangement 200 of FIG. 8. FIG. 14 shows a steering arrangement 500 which comprises a steering column 502, a kingpin 504 and a steering yoke 506. In this embodiment, the steering yoke 506 is conformally located adjacent a front part 508 of the vehicle body. This provides for a stronger and more reliable location of the yoke 506.

A front swing arm 510 is connected to the steering yoke 506 and the front swing arm 510 is, in turn, connected to a front wheel 512 which is rotatably secured at an end thereof. A shock absorber 514 is connected between the front swing arm 510 and the steering yoke 506. The shock absorber 514 may optionally be controlled by a damper controller similar to that described above. As can be seen in FIG. 14, the centreline of the kingpin Z3 passes forwardly of the centre of the front wheel 512. This enables the front wheel 512 to castor.

Similarly to the embodiment of FIG. 13, the steering column 502 is in mechanical communication with the steering yoke 506 by means of a pair of bevel gears 516, 518. However, other alternative mechanical connections may be used; for example, a rack and pinion system or a worm gear and follower.

The proximity of the steering yoke 506 to the front part 510 of the vehicle body in this embodiment enables the addition of a pair of castor shimmy dampers 520 (only one of which is shown in FIG. 14). Each castor shimmy damper 520 is connected between the front part 510 of the vehicle body and the steering yoke 506 and is arranged to prevent shimmy of the front wheel 512 when operating in a castoring mode. In this embodiment, the castor shimmy damper 520 may be a spring.

Additionally, the castor shimmy dampers 520 may be replaced by a pair of hydraulic cylinders such as the cylinders 144 described with reference to the rear wheel arrangement. In this configuration, the hydraulic cylinders could be used to steer the vehicle in the first (manual counter steer) mode of operation, or as a failsafe mode should the bevel gear arrangement fail.

In common with the rear wheel arrangement, such a hydraulic cylinder arrangement, with a hydraulic cylinder located either side of the steering arrangement, springs may be provided on the hydraulic cylinder (similarly to earlier embodiments) to return the front wheel 512 of the vehicle to the centre.

Figure 15:
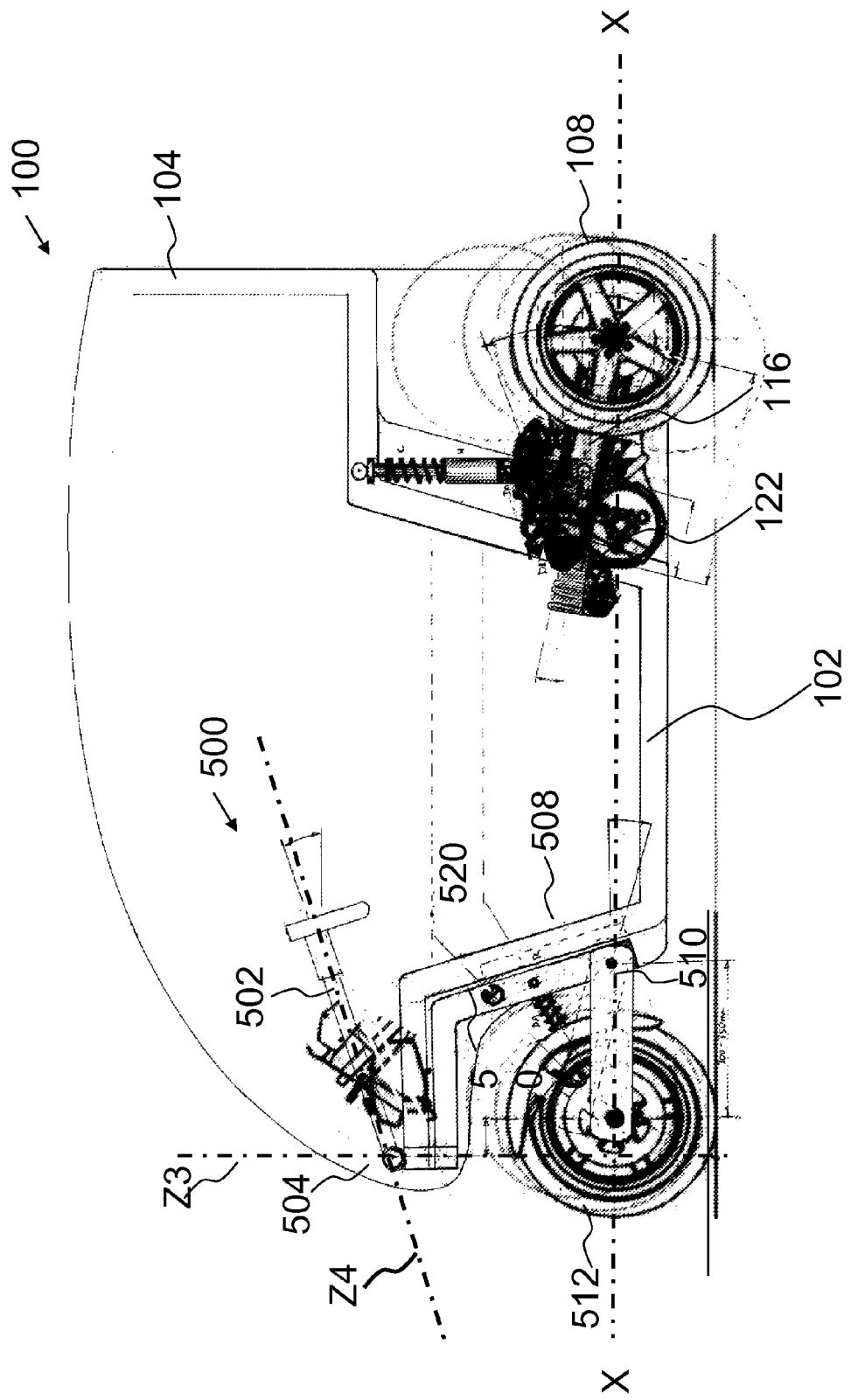
FIG. 15 is a schematic side view showing a vehicle incorporating the front wheel assembly of FIG. 12.

FIG. 15 shows the steering arrangement 500 incorporated into a vehicle 100 similar to that shown in FIGS. 1 to 3. For clarity, the features shown in FIG. 15 which are also shown in FIGS. 1 to 3 share the same reference numerals.

As shown in FIG. 15, the steering column 502 lies at an angle of between 10-15 degrees to the horizontal axis X-X. However, this may be adjustable to suit a particular driver. Additionally, the front swingarm 510 is able to pivot relative to the steering yoke 506 through an angle between 10-15 degrees relative to the horizontal axis X-X. This enables the vehicle 100 to traverse surface irregularities such as bumps or hills. The rear swing awls 116 are also able to pivot about their central axis at an angle of between 20-35 degrees either side of the horizontal axis X-X.

Additionally, as shown in FIG. 15, the propulsion unit 122 is located at least partially between the rear wheels. This arrangement enables a low, rearward centre of gravity, improving the stability of the vehicle in a turn.

The above arrangements each relate to a three wheeled vehicle wherein a single front wheel is provided. However, the present invention is also applicable to four wheeled vehicles. FIGS. 16 to 21 illustrate alternative steering arrangements suitable for use with a four wheeled vehicle.

Figure 16:
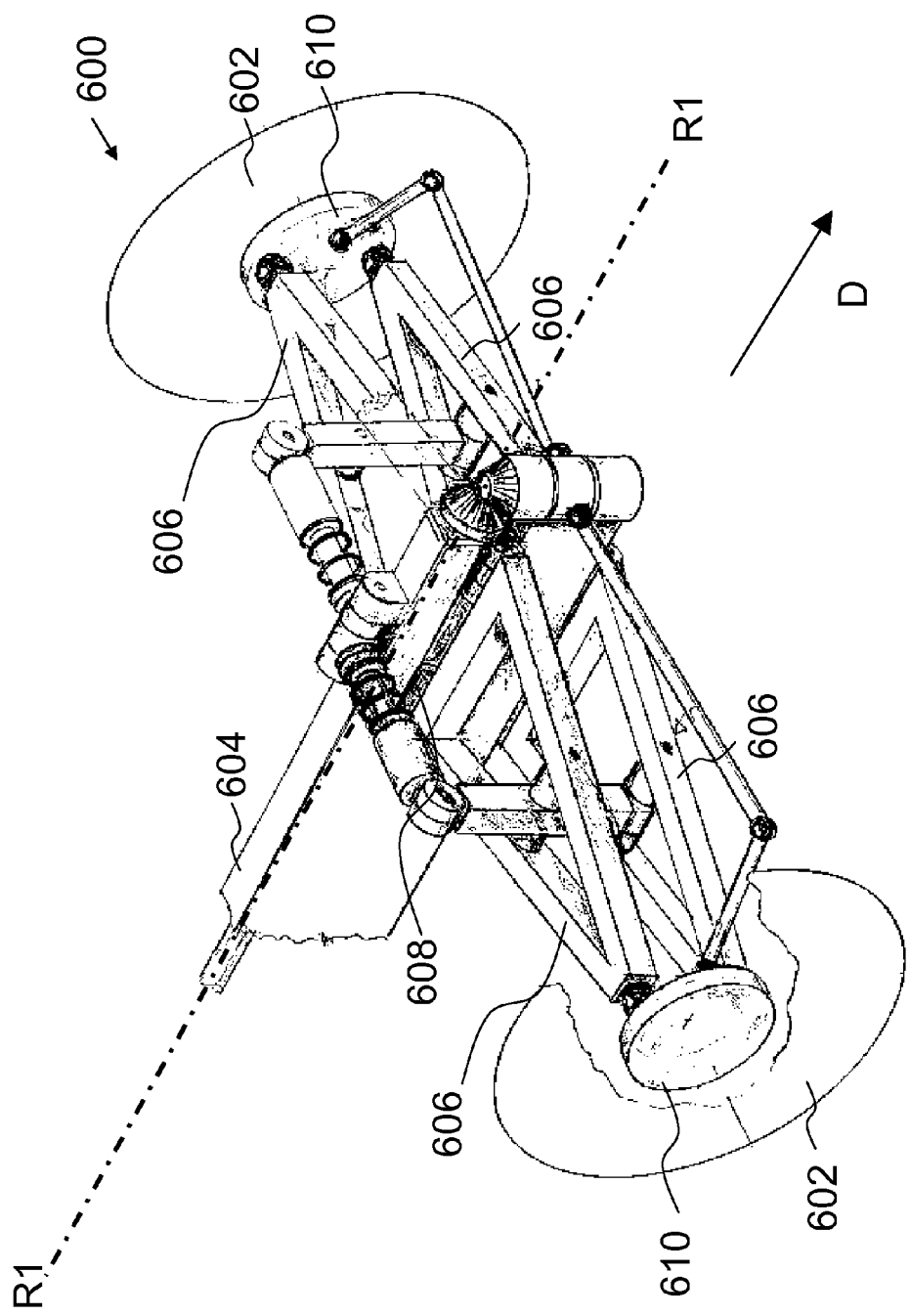
FIG. 16 is an isometric view of an alternative front wheel assembly for a vehicle having two front wheels.

FIG. 16 shows an embodiment of a steering arrangement 600 in which two front wheels 602 are provided. The two front wheels 602 are able to steer, tilt and castor as for the previous steering arrangements 300, 400, 500 comprising only a single front wheel. The steering arrangement 600 comprises a central beam 604 which is arranged to rotate about an axis R1-R1 lying parallel to the axis X-X shown in FIG. 1. The central beam 604 is arranged to rotate with remainder of the chassis 102 of the vehicle 100, such that the vehicle 100 tilts in a turn. The forward direction of the vehicle is indicated by the arrow D. Attached to the central beam 604 are four A shaped-arms 606. Each A-arm comprises two rods joined at one end and connected to a common cross member at another end. Each A-arm forms a triangular member.

Two A-arms 606 are located on opposing upper sides of the central beam 604 and are connected by hinges 608. A further two A-arms are hinged at opposing lower sides of the central beam 604. In other words, a pair of A-arms 606 extends away from each side of the central beam 604. A front wheel 602 is located at the distal end of each pair of A-arms 606. Each front wheel 602 is connected to each pair of A-arms 606 by a hub 610. Consequently, rotation of the central beam 604 with respect to the remainder of the chassis 102 will cause the upper and lower A-arms 606 to be displaced laterally, causing each hub 610 (and, thus, each wheel 602 attached thereto) to rotate about an axis parallel to the axis R-R. Thus, tilting of the wheels 602 can be effected in this manner.

As an alternative to the propulsion unit 122, electric motors could be incorporated into each hub 610 to drive the front wheels if required. Whilst this will result in additional mass located towards the front of the vehicle, the enhanced stability provided for by the four wheel arrangement mitigates the issues associated with this.

A pair of damper arms 612 is provided. Each damper arm 612 is connected between the upper surface of the central beam 604 and both upper and lower respective A-arms 606. Each damper arm 612 comprises a connection rod portion 614 and a damper 616. The damper 616 is located substantially horizontally, with the connection rod portion 614 approximately perpendicular thereto and connected to the damper 616 by means of a pivot. When the central beam 604 is rotated, the connection rod portion 614 will also rotate with respect to the damper 616 about the pivot.

The central beam 604 is also arranged to accommodate a steering column 618. The steering column 618 extends through the central beam 604 and is arranged to rotate about the axis R1-R1. A bevel gear 620 is located at a distal end of the steering column 618 and is arranged to steer the front wheels 602 by means of a complementary bevel gear 622 located on a central spindle 624. Linkage arms 626 are connected between the central spindle 624 and the wheel hubs 610, enabling rotation of the steering column 618 to steer the front wheels 602 when in the first mode of operation. The mechanical link between the steering column 618 and the wheels 602 can, optionally, be disengaged to enable the front wheels 602 to be free to castor, as is required in the second mode of operation.

Alternatively, instead of a bevel gear, a worm gear, rack and pinion or hydraulic rams could be provided to effect steering of the vehicle. As a further alternative, two steering arms, one either side of the central beam 604, could be provided.

Figure 17:
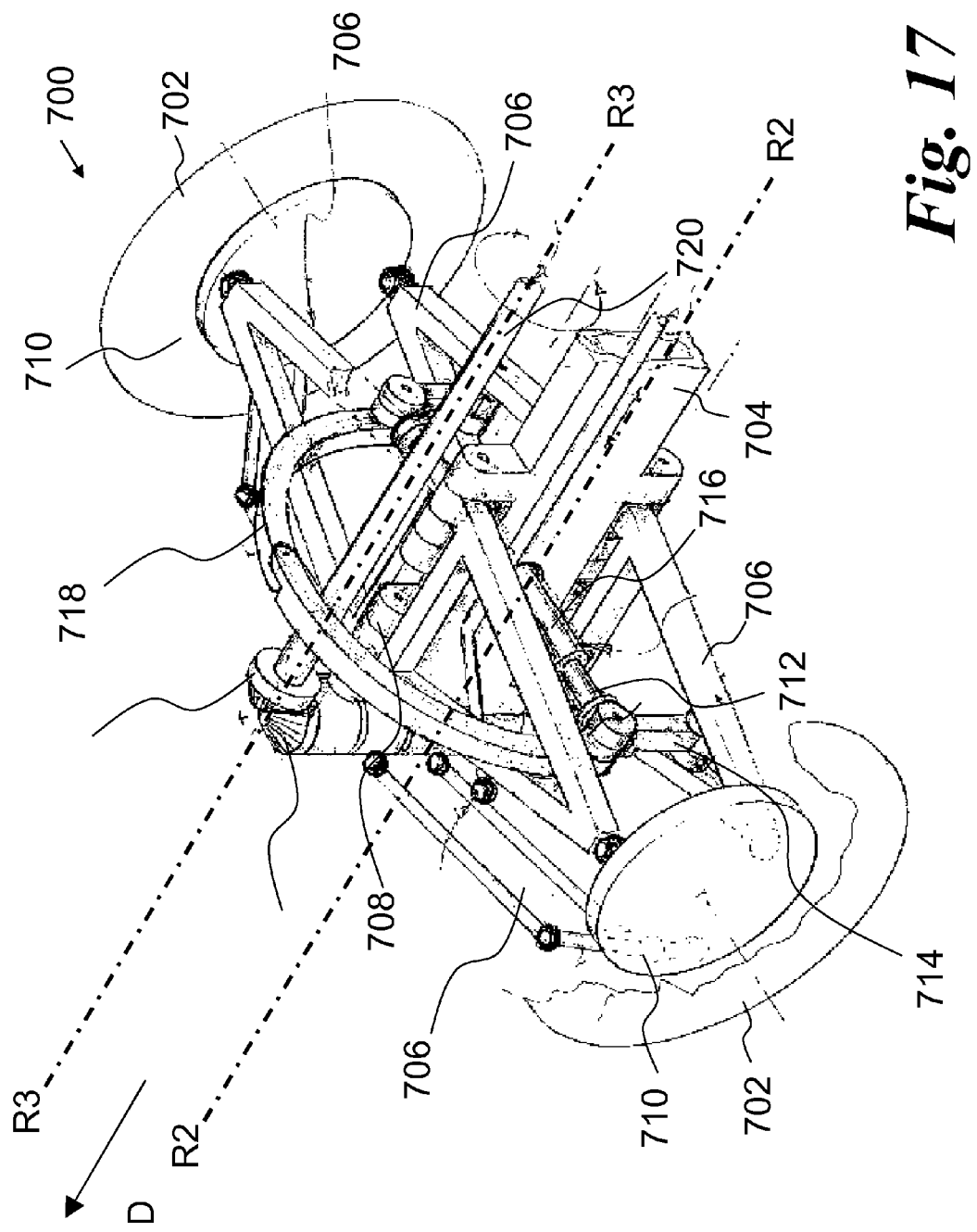
FIG. 17 is an isometric view of a further alternative front wheel assembly for a vehicle having two front wheels.

FIG. 17 shows a further alternative embodiment of a steering arrangement 700 in which two front wheels 702 are provided. The two front wheels 702 are able to steer, tilt and castor as for the previous steering arrangements 300, 400, 500 comprising only a single front wheel and steering arrangement 600 comprising two front wheels.

The steering arrangement 700 comprises a central beam 704 which is arranged to rotate about an axis R2-R2 lying parallel to the axis X-X shown in FIG. 1. The central beam 704 is arranged to rotate with the remainder of the chassis 102 of the vehicle 100. The forward direction of the vehicle is indicated by the arrow D.

Attached to the central beam 704 are four A-arms 706. Two A-arms 706 are located on opposing upper sides of the central beam 704 and are connected by hinges 708. A further two A-arms 706 are hinged at opposing lower sides of the central beam 704. In other words, a pair of A-arms 706 extends away from each side of the central beam 704.

A front wheel 702 is located at the distal end of each pair of A-arms 706. Each front wheel 702 is connected to each pair of A-arms 706 by a hub 710. Consequently, rotation of the central beam 704 with respect to the remainder of the chassis 102 will cause the upper and lower A-arms 706 to be displaced laterally, causing each hub 710 (and, thus, each wheel 702 attached thereto) to rotate about an axis parallel to the axis R2-R2. Thus, tilting of the wheels 702 can be effected in this manner.

As an alternative to the propulsion unit 122, electric motors could be incorporated into each hub 610 to drive the front wheels if required. Whilst this will result in additional mass located towards the front of the vehicle, the enhanced stability provided for by the four wheel arrangement mitigates the issues associated with this.

A pair of damper arms 712 is provided. However, in contrast to the previous embodiment, each damper arm 712 is connected between the middle side surface of the central beam 704 and only the lower respective A-arm 706. Each damper arm 712 comprises a connection rod portion 714 and a damper 716. The damper 716 is located substantially horizontally, with the connection rod portion 714 approximately perpendicular thereto and connected to the damper 716 by means of a pivot. When the central beam 704 is rotated, the connection rod portion 714 will also rotate with respect to the damper 716 about the pivot. In addition, in this embodiment, the pivots of each damper arms 712 are connected by a curved linkage 718. The curved linkage 718 is divided into two portions connected by a central joint. The curved linkage 718 extends through the centre of the upper A-arms 706 and over and above the central beam 704. Whilst the linkage is described in this embodiment as being curved, this need not be so. The curved arrangement is useful for space efficiency; however, other arrangements could be used, for example, a straight linkage.

The provision of such an arrangement enables the dampers 712 to be mounted lower in the vehicle 100, lowering the centre of gravity of the vehicle 100 as a whole. Additionally, this arrangement reduces the unsprung mass of the vehicle. A low centre of gravity and low unsprung mass is important for a fully enclosed tilting vehicle to provide maneuverability, side wind stability and stability under braking.

A steering column 720 extends above, and can be parallel to the central beam 704. The steering column 720 is arranged to rotate about the axis R3-R3 which is parallel to, and spaced from, the axis R2-R2. Steering of the vehicle is effected by means of a bevel gear or similar arrangement. This arrangement was described with reference to the previous embodiment and will not be described further here.

Linkage arms 722 are connected between a central spindle 724 and the wheel hubs 710, enabling rotation of the steering column 720 to steer the front wheels 702 when in the first mode of operation. However, in contrast to the previous embodiment, four linkage arms 722 (i.e. two pairs) are provided. This option provides a failsafe mechanism in the event that the free to castor mode is engaged at high speed and a failure of the primary bevel gear or steering linkage occurs.

The mechanical link between the steering column 720 and the wheels 702 can, optionally, be disengaged to enable the front wheels 602 to be free to castor, as is required in the second mode of operation. Free to castor operation is possible if the steering linkage arms 722 are located either forwardly or rearwardly of the centreline of the wheel hubs 710 in all options.

Figure 18:
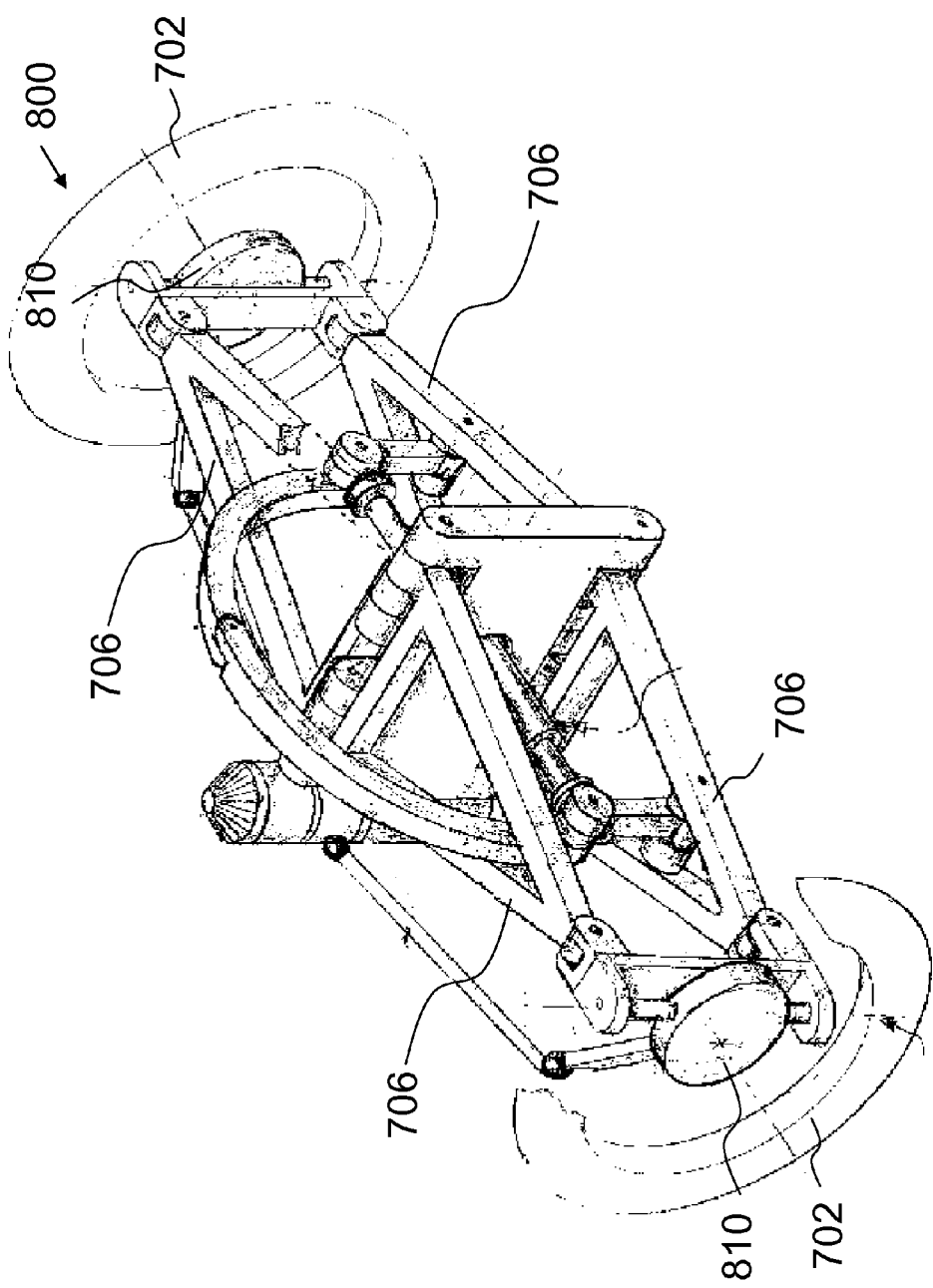
FIG. 18 is an isometric view of a yet further alternative front wheel assembly for a vehicle having two front wheels.

FIG. 18 shows a further alternative embodiment of a steering arrangement 800 in which two front wheels 802 are provided. The two front wheels 802 are able to steer, tilt and castor as for the previous steering arrangements 300, 400, 500 comprising only a single front wheel and steering arrangement 600, 700 comprising two front wheels.

The steering arrangement 800 is substantially similar to the steering arrangement 700 of the previous embodiment. Therefore, components in common there between will not be described again here and will use the same reference numerals as for the previous embodiment.

The steering arrangement 800 differs from the steering arrangement 700 in the provision of smaller and lighter wheel hubs 810. The wheel hubs 810 are smaller in diameter than the wheel hubs 710 of the previous embodiment and are connected to pivot hinges 812 attached to the A-arms 706. Additionally, only a single pair of linkage arms 722 is provided. However, the linkage arms 722 could again be duplicated in a failsafe mode. Additionally, the smaller diameter wheel hubs could also be used in the previous two front wheel arrangements described above.

The provision of such an arrangement enables the centre of gravity of the vehicle to be reduced yet further. Additionally, this arrangement further reduces the unsprung mass of the vehicle. A low centre of gravity and low unsprung mass is important for a fully enclosed tilting vehicle to provide maneuverability, side wind stability and stability under braking.

Figure 19:
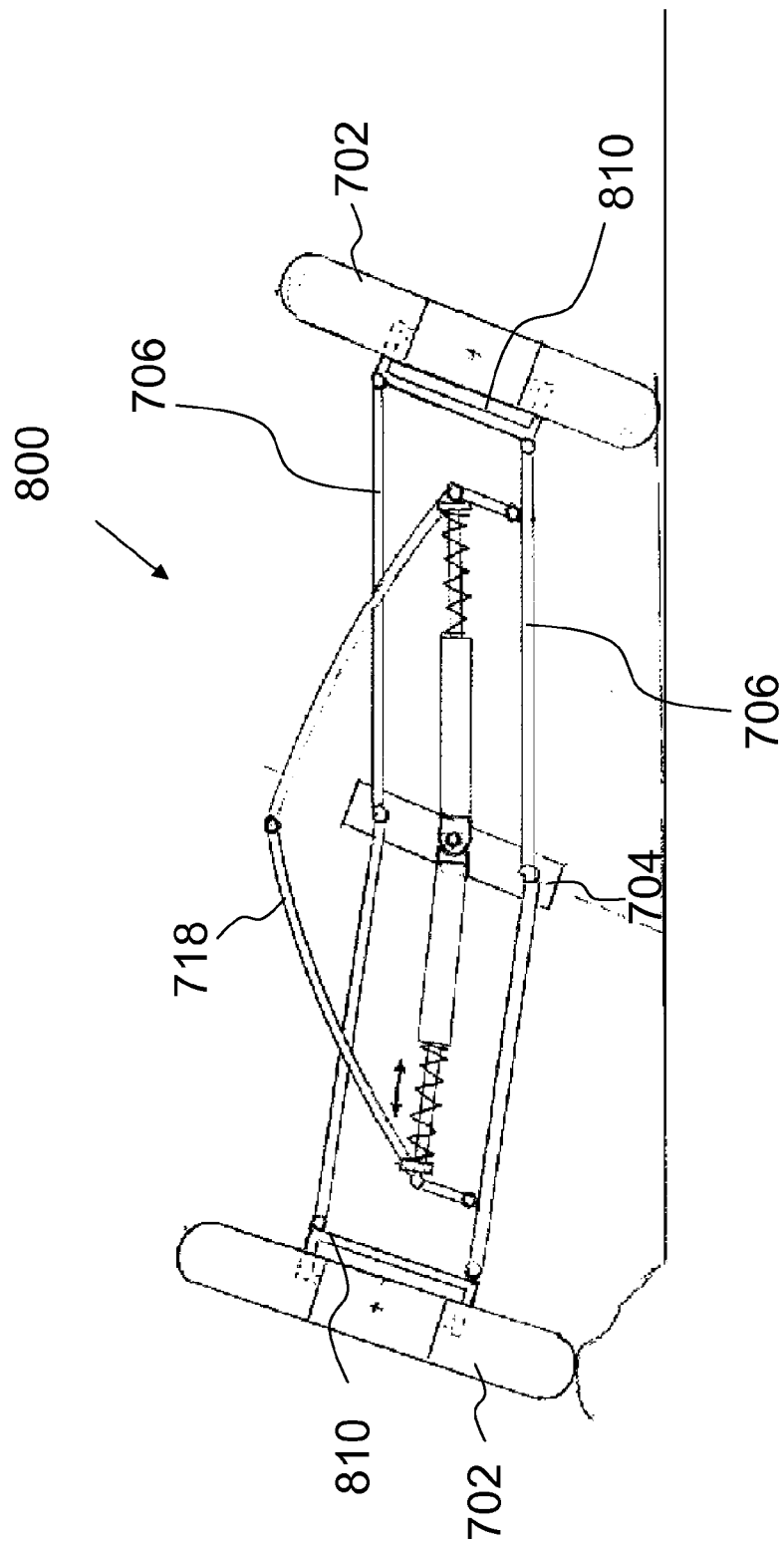
FIG. 19 is a simplified front schematic of an arrangement similar to those shown in FIGS. 17 and 18.

The operation of the above embodiment is illustrated in FIG. 19 with respect to the FIG. 18 embodiment. FIG. 19 shows a simplified version of the embodiment of FIG. 18 when in a turn on an uneven ground surface.

As shown in FIG. 19, when the vehicle turns, the central beam 704 (and thus the chassis 102 and body 104 of the vehicle) rotates, moving the A-arms 706 and causing the wheel hubs 810 to rotate parallel thereto, effecting tilting of the wheels 702. Further, due to the uneven ground, the left wheel 702 (as shown in FIG. 17) is higher than the right wheel 702. This displacement is opposed by the curved linkage 718 which provides a restoring force, preventing the shock absorber and left wheel 702 from moving too far relative to the remainder of the vehicle 100; i.e. preventing the vehicle 100 from collapsing onto one wheel. As shown, due to the independent front wheel arms 706, the front wheels are able to run over uneven ground without requiring the level of damper travel required for a vehicle in which a single, fixed parallelogram arrangement extends between both wheels.

Figure 20:
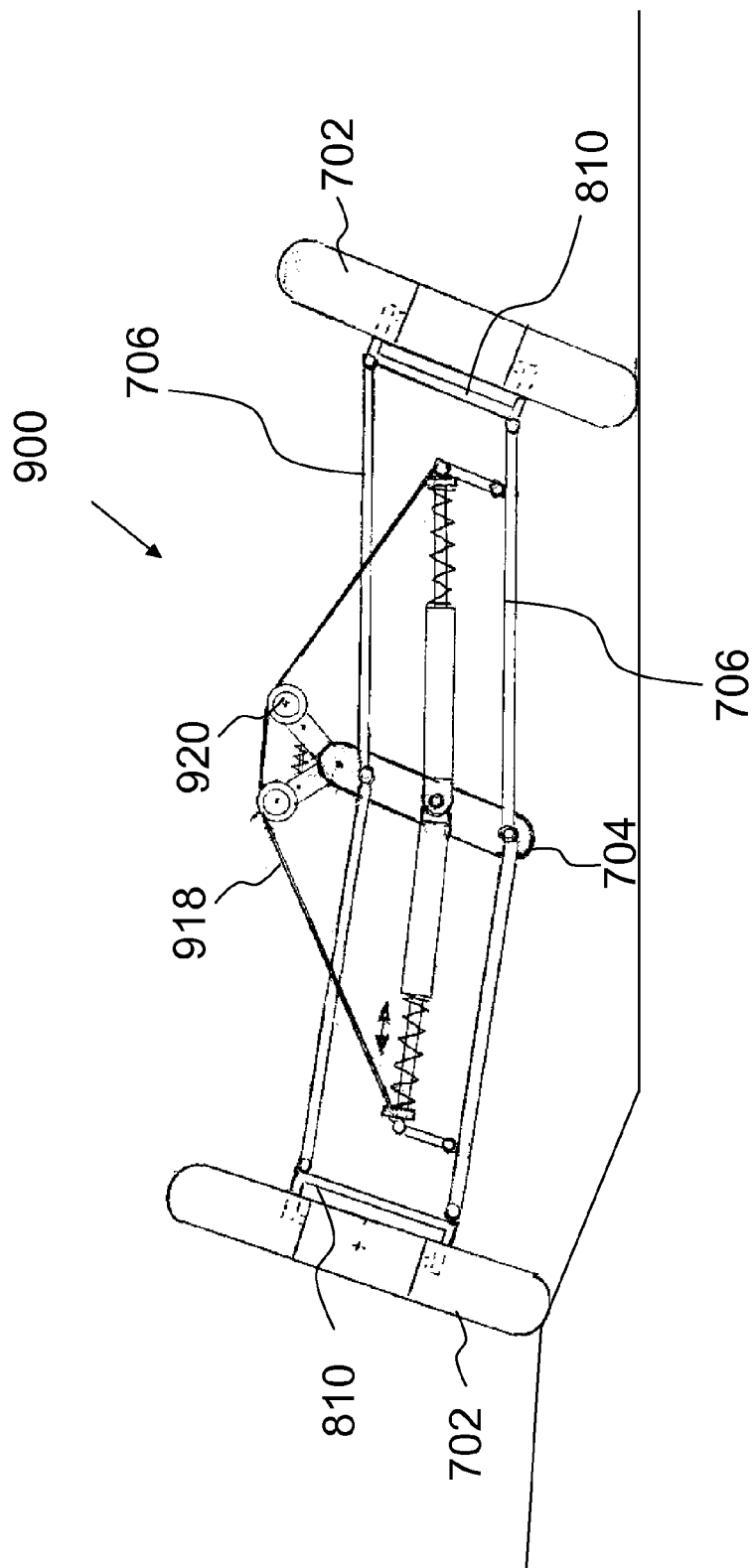
FIG. 20 is a simplified front schematic of a yet further alternative front wheel assembly.

A yet further embodiment of a steering arrangement 900 is illustrated schematically in FIG. 20. The steering arrangement 900 is substantially similar to the steering arrangements 700, 800 of the previous embodiments. Therefore, components in common there between will not be described again here and will use the same reference numerals as for the previous embodiments.

The steering arrangement 900 differs from the previous two embodiments in the provision of an alternative central linking member. Instead of the curved linkage 718 of the previous embodiments, an arrangement comprising tensioned wires 918 and pulleys 920 is provided. This arrangement provides the necessary restoring forces but may be lighter weight than the semicircular linkage 718 of the previous two embodiments. Additionally, a pair of pulleys/wires may be provided to achieve failsafe operation.

Figure 21:
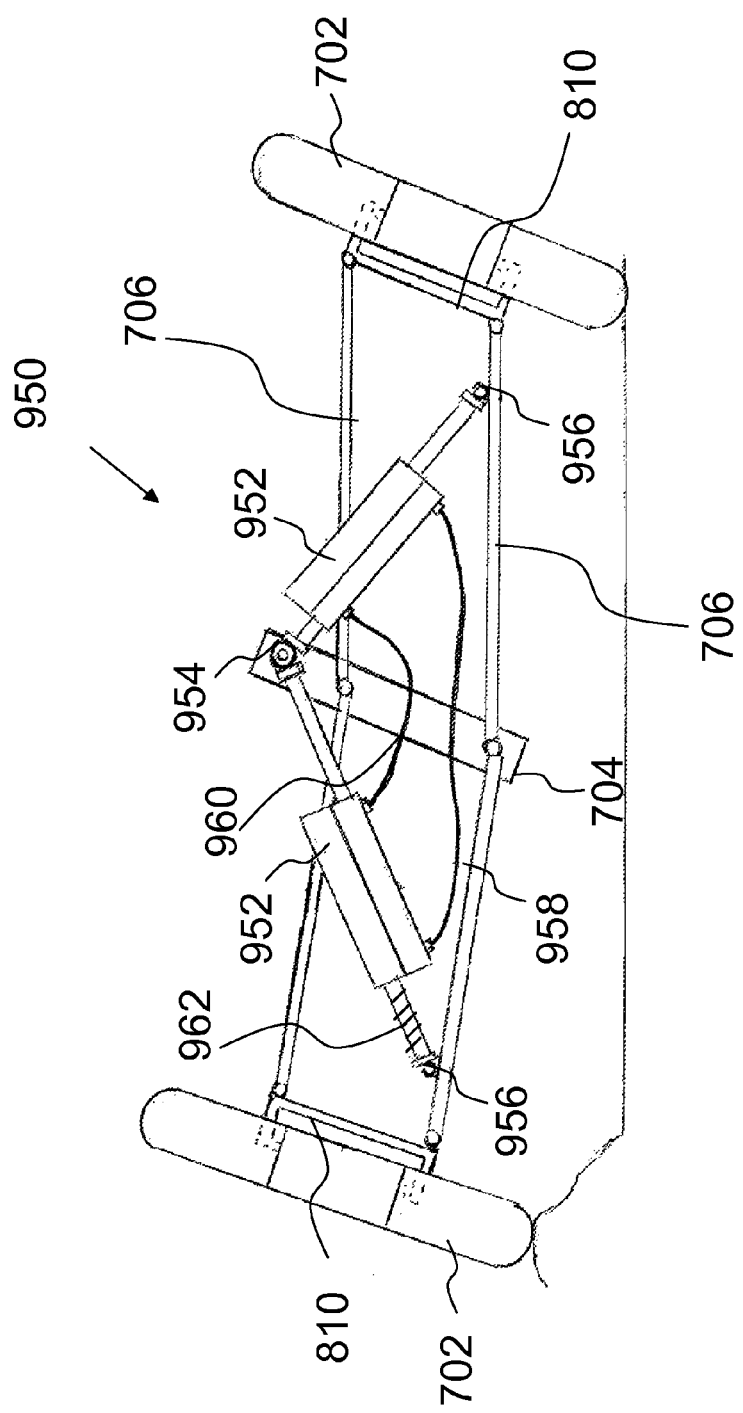
FIG. 21 is a simplified front schematic of a yet further alternative front wheel assembly.

A yet further embodiment of a steering arrangement 950 is illustrated schematically in FIG. 21. The steering arrangement 950 is substantially similar to the steering arrangements 700, 800, 900 of the previous embodiments. Therefore, components in common there between will not be described again here and will use the same reference numerals as for the previous embodiments.

The steering arrangement 950 differs from the previous embodiments in the provision of an alternative suspension and damper arrangement. The steering arrangement 950 comprises a pair of front hydraulic cylinders 952. The hydraulic cylinders 952 are structurally similar to the hydraulic cylinders 144 connected to the rear wheels of the vehicle 100 in earlier embodiments. Therefore, each hydraulic cylinder 952 comprises a movable piston (not shown) which divides each hydraulic cylinder 952 into two separate chambers.

Each hydraulic cylinder 952 is connected at one end to the upper end central beam 704 by means of a pivotable connection 954, and at a lower end to a respective lower A-arm 706 as shown in FIG. 21. The two hydraulic cylinders 952 are fluidly connected at lower ends by means of a lower connection pipe 958 and at upper ends by means of an upper connection pipe 960. Therefore, the two hydraulic cylinders 952 are able to move oppositely and in unison as fluid is passed back and forth therebetween to effect tilting of the front wheel arrangement 950.

In one arrangement, the two hydraulic cylinders 952 could be linked with the rear hydraulic cylinders 144 to form a circuit of cylinders connecting the front and rear wheels. Additionally, the pump arrangement 202 could be used to control the operation of the front hydraulic cylinders 952 in addition to the rear hydraulic cylinders 144.

Additionally, a spring 962 (only one of which is shown in FIG. 21) may be provided as a biasing means on the hydraulic cylinders 952 to provide a restoring force to the vehicle 100 in order to upright the body of the vehicle 100. This means that, in the absence of any other forces, the body of the vehicle 100 will return to the upright position.

Although the embodiments shown above have been illustrated with respect to a tilting four wheel vehicle, the above quadruple parallelogram arrangement of A-arms and curved linkage (or, alternatively, a quadruple parallelogram arrangement with wire and pulley link) could also suitable for use in a conventional non-tilting four wheel vehicle, such as an automobile. Additionally, the above-described arrangement could also be suitable for a tilting two front wheel, one rear wheel vehicle or a tilting/non-tilting tractor or off-road quad bike.

Additionally, the above arrangements could be used to control the two front skis of a tilting or non-tilting snow mobile. The above examples could all have manual steer control.

The above described arrangements could also be used with the front wheel arrangement 950 shown in FIG. 21 and could be applied to the hydraulic cylinders 952 illustrated therein.

Whilst it is preferred that the vehicle 100 has three wheels only, the vehicle 100 could alternatively have four wheels with two wheels at the front and two wheels at the back as shown in earlier embodiments.

Instead of using a single propulsion unit for driving both rear wheels, each rear wheel could be driven by its own dedicated motor. The drive may be direct from the motor, in which case the motor can effectively form the swing arm. Alternatively, the drive may be indirect via a chain, belt or shaft, for example.

The front wheel may optionally be driven from its own dedicated motor or from the motor or motors that drive the rear wheels.

It will be appreciated that various components, including for example the differential for the rear wheels, are not shown in the drawings for reasons of clarity only. Whilst the rear wheels of the example described above are shown as being mounted on one side of their respective swing arms 116, the swing arms could be forked with the rear wheels mounted between the forks of the swing arm.

Variations of the above embodiments will be apparent to the skilled person. The precise configuration of hardware and software components may differ and still fall within the scope of the present invention.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A vehicle comprising:
a chassis, at least one front wheel, two surface-engaging rear wheels, a centreline extending from the front to the rear of the chassis, and a propulsion unit for driving the rear wheels, each rear wheel being connected to the chassis by a wheel support assembly, the wheel support assemblies and the chassis being arranged such that the chassis, the or each front wheel, and the rear wheels are configured to tilt in unison in either direction with respect to a vertical, upright position of the chassis such that the or each front wheel and each rear wheel lies in a plane parallel to the centreline of the chassis irrespective of the angle of tilt of the chassis, each wheel support assembly comprising:
a rear wheel support for allowing movement of the respective rear wheel relative to the chassis, each rear wheel support and respective rear wheel being movable independently of the other rear wheel support and respective rear wheel in a plane parallel to the centreline of the chassis; and
a hydraulic cylinder, the hydraulic cylinder comprising:
a housing connected to one of the chassis and the rear wheel support; and
a piston connected to the other of the rear wheel support and the chassis, the piston being moveable within the housing and arranged to divide the hydraulic cylinder into first and second chambers each having respective ports configured to allow hydraulic fluid to enter and exit the respective chamber;
wherein the ports of the first chambers of each hydraulic cylinder being in fluid communication and the ports of the second chambers of each hydraulic cylinder being in fluid communication such that movement of hydraulic fluid from the first or second chamber of one hydraulic cylinder to the respective first or second chamber of the other hydraulic cylinder displaces the pistons of the hydraulic cylinders in opposing directions relative to the respective housings and causes the chassis, the or each front wheel, and the rear wheels to tilt with respect to the ground surface;
wherein the vehicle further comprises a pump arrangement, the movement of hydraulic fluid being selectively controlled by the pump arrangement.

2. A vehicle according to claim 1, wherein at least a part of said propulsion unit is located substantially between the wheel support assemblies or between the rear wheels.

3. A vehicle according to claim 1, further comprising a power source.

4. A vehicle according to claim 3, wherein at least a part of the power source is located between the wheel support assemblies or between the rear wheels.

5. A vehicle according to claim 3, wherein the propulsion unit comprises an internal combustion engine and the power source comprises a fuel tank.

6. A vehicle according to claim 3, wherein the propulsion unit comprises an electric motor and the power source comprises at least one battery and/or a fuel cell.

7. A vehicle according to claim 1, wherein the wheel support assemblies and chassis are configured to enable the chassis to tilt up to an angle of substantially 30 degrees in either direction with respect to a vertical, upright position of the chassis.

8. A vehicle according to claim 7, wherein the propulsion unit, power source and chassis are arranged such that the centre of gravity of the vehicle remains substantially between the rear wheels irrespective of the angle of tilt of the chassis.

9. A vehicle according to claim 1, wherein the pump arrangement is electrically operated.

10. A vehicle according to claim 1, further comprising a control arrangement, the control arrangement comprising a control device to enable the user to steer the vehicle.

11. A vehicle according to claim 10, wherein said control arrangement is configured such that, in a first mode of operation, the at least one front wheel is steerable by operation of said control device.

12. A vehicle according to claim 11, wherein, in said first mode of operation, movement of hydraulic fluid from one hydraulic cylinder to another can be accomplished by application of a force to one side such that the chassis is caused to tilt downwards on the side to which the force is applied.

13. A vehicle according to claim 1, further comprising stop means selectively operable to prevent fluid flow between at least one of the first chambers and the second chambers, thereby selectively to inhibit tilting of the vehicle.

14. A vehicle according to claim 13, wherein said stop means is controlled automatically by an electronic controller in response to pre-defined vehicle parameters.

15. A vehicle according to claim 14, wherein said electronic controller comprises accelerometers and said electronic controller is operable to control said stop means based on information from said accelerometers.

16. A vehicle according to claim 1, wherein each rear wheel support is configured to provide vertical pivotal movement of the respective rear wheel relative to the chassis.

17. A vehicle according to claim 16, wherein the rear wheel support for each rear wheel comprises a tailing swing arm pivotally mounted at a first end to the chassis and carrying a rear wheel at a second end.

18. A vehicle according to claim 1, wherein the connection of at least one of the cylinder housings to the rear wheel support or the chassis is via a shock absorber.

19. A vehicle according to claim 18, wherein the shock absorber is integral with or rigidly connected to said at least one housing.

20. A vehicle according to claim 18, wherein at least one of the pistons is provided by a shock absorber.

21. A vehicle according to claim 17, wherein each trailing swing arm comprises a primary swing arm pivotally connected to the chassis and a secondary swing arm pivotally connected at a first end to the primary swing arm and carrying a rear wheel at the other end.

22. A vehicle according to claim 21, wherein the hydraulic cylinder for each rear wheel support connected between the chassis and the primary swing arm, and comprising a shock absorber connected between the primary swing arm and the secondary swing arm.

23. A vehicle according to claim 1, wherein each rear wheel support assembly further comprises biasing means configured to apply a restoring force between the chassis and the respective rear wheel to oppose the tilting of the chassis.

24. A vehicle according to claim 23, wherein the biasing means comprises a spring.

25. A vehicle according to claim 24, wherein the spring comprises a coil spring located between the respective hydraulic cylinder and the chassis or the rear wheel support.

26. A vehicle according to claim 1, wherein the vehicle comprises two front wheels, each front wheel being connected to the chassis by means of a steering arrangement, wherein the steering arrangement comprises a pair of front hydraulic cylinders, each front hydraulic cylinder comprising:
a housing connected to one of the chassis and the steering arrangement; and
a piston connected to the other of the steering arrangement and the chassis, the piston being moveable within the housing and configured to divide the front hydraulic cylinder into first and second chambers each having respective ports configured to allow hydraulic fluid to enter and exit the respective chamber,
the ports of the first chambers of each front hydraulic cylinder being in fluid communication and the ports of the second chambers of each front hydraulic cylinder being in fluid communication such that movement of hydraulic fluid from the first or second chamber of one front hydraulic cylinder to the respective first or second chamber of the other front hydraulic cylinder displaces the pistons of the front hydraulic cylinders.

27. A vehicle according claim 26, wherein the front hydraulic cylinders are in fluid communication with the hydraulic cylinders attached to the rear wheel supports.

28. A vehicle according to claim 1, further comprising a body connected to said chassis and defining an interior space of the vehicle configured to accommodate a driver.

29. A vehicle according to claim 28, wherein said interior space is fully enclosed.

30. A vehicle according to claim 28, wherein an openable door is formed in said body.

31. A vehicle comprising:
a chassis, at least one front wheel, two surface-engaging rear wheels and a propulsion unit for driving the rear wheels, each rear wheel being connected to the chassis by a wheel support assembly comprising:
a rear wheel support for allowing movement of the respective rear wheel relative to the chassis; and
a hydraulic cylinder, the hydraulic cylinder comprising:
a housing connected to one of the chassis and the rear wheel support; and
a piston connected to the other of the rear wheel support and the chassis, the piston being moveable within the housing and arranged to divide the hydraulic cylinder into first and second chambers each having respective ports configured to allow hydraulic fluid to enter and exit the respective chamber,
the ports of the first chambers of each hydraulic cylinder being in fluid communication and the ports of the second chambers of each hydraulic cylinder being in fluid communication such that movement of hydraulic fluid from the first or second chamber of one hydraulic cylinder to the respective first or second chamber of the other hydraulic cylinder displaces the pistons of the hydraulic cylinders in opposing directions relative to the respective housings and causes the chassis to articulate with respect to the ground surface, wherein the vehicle further comprises a pump arrangement, a bypass valve arranged in parallel with the pump arrangement and a control arrangement comprising a control device to enable the user to steer the vehicle, the movement of hydraulic fluid being selectively controlled by the pump arrangement, wherein, in a first mode of operation, the at least on front wheel is steerable by operation of said control device and said control arrangement is configured to open said bypass valve to bypass said pump arrangement such that movement of hydraulic fluid from one hydraulic cylinder to another can be accomplished by application of a force to one side such that the chassis is caused to tilt downwards on the side to which the force is applied.

32. A vehicle according to claim 31, comprising a second mode of operation, wherein the control arrangement is configured to control said pump arrangement such that the vehicle is tiltable in response to operation of said control device.

33. A vehicle according to claim 32, wherein, in said second mode of operation, the at least one front wheel is free to castor.

34. A vehicle according to claim 32, wherein the control arrangement is operable to select automatically one of the first and second modes of operation based upon at least one vehicle parameter selected from the group of: vehicle speed, vehicle acceleration, vehicle rate of turn and vehicle direction.

35. A vehicle according to claim 34, wherein the control arrangement is operable to select the first mode when the speed of the vehicle is below a pre-defined value and to select the second mode when the speed of the vehicle is equal to or exceeds said pre-defined value.

36. A vehicle according to claim 35, wherein said pre-defined value is in the range of 5-30 km/h.

37. A vehicle comprising:
a chassis, at least one front wheel, two surface-engaging rear wheels and a propulsion unit for driving the rear wheels, each rear wheel being connected to the chassis by a wheel support assembly comprising:
a rear wheel support for allowing movement of the respective rear wheel relative to the chassis; and
a hydraulic cylinder, the hydraulic cylinder comprising:
a housing connected to one of the chassis and the rear wheel support; and
a piston connected to the other of the rear wheel support and the chassis, the piston being moveable within the housing and arranged to divide the hydraulic cylinder into first and second chambers each having respective ports configured to allow hydraulic fluid to enter and exit the respective chamber,
the ports of the first chambers of each hydraulic cylinder being in fluid communication and the ports of the second chambers of each hydraulic cylinder being in fluid communication such that the movement of the hydraulic fluid from the first or second chamber of one hydraulic cylinder to the respective first or second chamber of the other hydraulic cylinder displaces the pistons of the hydraulic cylinders in opposing directions relative to the respective housings and causes the chassis to articulate with respect to the ground surface, wherein the vehicle further comprises a pump arrangement, the movement of hydraulic fluid being selectively controlled by the pump arrangement;

wherein the pump arrangement comprises a bidirectional pump.

38. A method of tilting a vehicle comprising a chassis, at least one front wheel, two surface-engaging rear wheels, a centreline extending from the front to the rear of the chassis, and a propulsion unit for driving the rear wheels, each rear wheel being connected to the chassis by a wheel support assembly, the wheel support assemblies and the chassis being arranged such that the chassis, the or each front wheel, and the rear wheels are configured to tilt in unison in either direction with respect to a vertical, upright position of the chassis such that the or each front wheel and each rear wheel lies in a plane parallel to the centreline of the chassis irrespective of the angle of tilt of the chassis, each wheel support assembly comprising: a rear wheel support for allowing movement of the respective rear wheel relative to the chassis, each rear wheel support and respective rear wheel being movable independently of the other rear wheel support and respective rear wheel in a plane parallel to the centreline of the chassis; and a hydraulic cylinder, the hydraulic cylinder comprising: a housing connected to one of the chassis and the rear wheel support; and a piston connected to the other of the rear wheel support and the chassis, the piston being moveable within the housing and arranged to divide the hydraulic cylinder into first and second chambers each having respective ports configured to allow hydraulic fluid to enter and exit the respective chamber, the ports of the first chambers of each hydraulic cylinder being in fluid communication and the ports of the second chambers of each hydraulic cylinder being in fluid communication; wherein the method comprises:

selectively controlling a pump arrangement to move hydraulic fluid from the first or second chamber of one hydraulic cylinder to the respective first or second chamber of the other hydraulic cylinder in order to displace the pistons of the hydraulic cylinders in opposing directions relative to the respective housings and to cause the chassis, the or each front wheel, and the rear wheels to tilt with respect to the surface.

* * * * *